US008702163B2

(12) United States Patent
Westerink et al.

(10) Patent No.: US 8,702,163 B2
(45) Date of Patent: Apr. 22, 2014

(54) SEAT BACK ASSEMBLY

(75) Inventors: Rik Westerink, Corinth, TX (US);
Jeffrey P. Wegenka, Denton, TX (US);
Brad Grunwald, Garland, TX (US);
Elias Cardozo, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 470 days.

(21) Appl. No.: 13/017,422

(22) Filed: Jan. 31, 2011

(65) Prior Publication Data

US 2011/0187163 A1 Aug. 4, 2011

Related U.S. Application Data

(60) Provisional application No. 61/299,392, filed on Jan. 29, 2010.

(51) Int. Cl.
*A47B 83/02* (2006.01)
*A47C 7/62* (2006.01)

(52) U.S. Cl.
USPC .................. 297/163; 297/146; 297/188.04

(58) Field of Classification Search
USPC ........ 297/146, 144, 163, 173, 188.04, 188.06
See application file for complete search history.

(56) References Cited

U.S. PATENT DOCUMENTS

| | | | | |
|---|---|---|---|---|
| 3,615,118 A | * | 10/1971 | Buxton | 297/188.07 |
| 3,773,381 A | | 11/1973 | Brennan | |
| 3,795,422 A | * | 3/1974 | Robinson et al. | 297/146 |
| 4,281,874 A | | 8/1981 | Iwans et al. | |
| 4,836,602 A | * | 6/1989 | d'Almada Remedios et al. | 297/188.06 |
| 7,287,817 B2 | * | 10/2007 | Goldman | 297/463.2 |
| 2003/0193220 A1 | * | 10/2003 | Jensen | 297/146 |
| 2004/0100137 A1 | | 5/2004 | Johnson | |

(Continued)

FOREIGN PATENT DOCUMENTS

AT 305040 2/1973
DE 3433589 A1 3/1986

(Continued)

OTHER PUBLICATIONS

International Preliminary Report on Patentability dated Jan. 10, 2013 in Application No. PCT/US2011/041570.

(Continued)

*Primary Examiner* — Milton Nelson, Jr.
(74) *Attorney, Agent, or Firm* — Tiffany L. Williams; Dean W. Russell; Kilpatrick Townsend & Stockton LLP

(57) ABSTRACT

Embodiments of the present invention include a seat back assembly comprising a seat back with a recess and a tray table assembly. The table body is configured to substantially fit within the recess. An amenity compartment may also be coupled to the seat back above the tray table assembly and may be configured to also substantially fit within the recess. The amenity compartment may be a bezel or an upper literature pocket. A latching mechanism releasably engages the tray table assembly with the amenity compartment. The amenity compartment may be coupled to the seat back via a hook that engages a slotted bracket on the seat back and projections that engage receptacles on the seat back. A protective covering may be inserted between the seat back and the amenity compartment and coupled to the seat back without additional fasteners. The protective covering may be a full shroud, a partial shroud, or a dress cover.

15 Claims, 21 Drawing Sheets

(56) References Cited

U.S. PATENT DOCUMENTS

| | | | |
|---|---|---|---|
| 2004/0124675 A1* | 7/2004 | Ingram et al. | 297/146 |
| 2005/0077070 A1 | 4/2005 | Geelhaar et al. | |
| 2005/0132407 A1 | 6/2005 | Boyer et al. | |
| 2006/0175882 A1* | 8/2006 | Schweizer | 297/217.3 |
| 2008/0252111 A1 | 10/2008 | Rothkop et al. | |
| 2011/0316311 A1 | 12/2011 | Westerink et al. | |

FOREIGN PATENT DOCUMENTS

| | | |
|---|---|---|
| FR | 2855472 A1 | 12/2004 |
| WO | WO2009109778 A1 * | 7/1991 |
| WO | WO9004381 | 1/1999 |
| WO | 2011041760 A2 | 4/2011 |
| WO | WO2011094668 | 8/2011 |

OTHER PUBLICATIONS

International Preliminary Report on Patentability dated Aug. 9, 2012 in Application No. PCT/US2011/023124.

International Search Report and Written Opinion dated Dec. 23, 2011 in Application No. PCT/US2011/041570.

International Search Report and Written Opinion dated Aug. 16, 2011 in related Application No. PCT/US2011/023124.

* cited by examiner

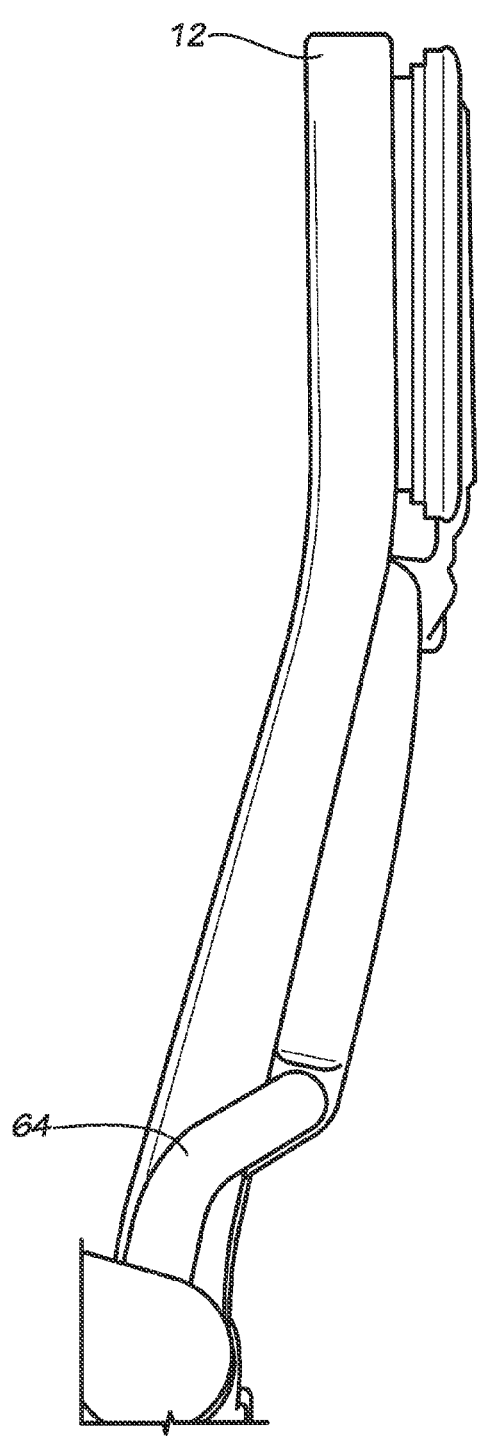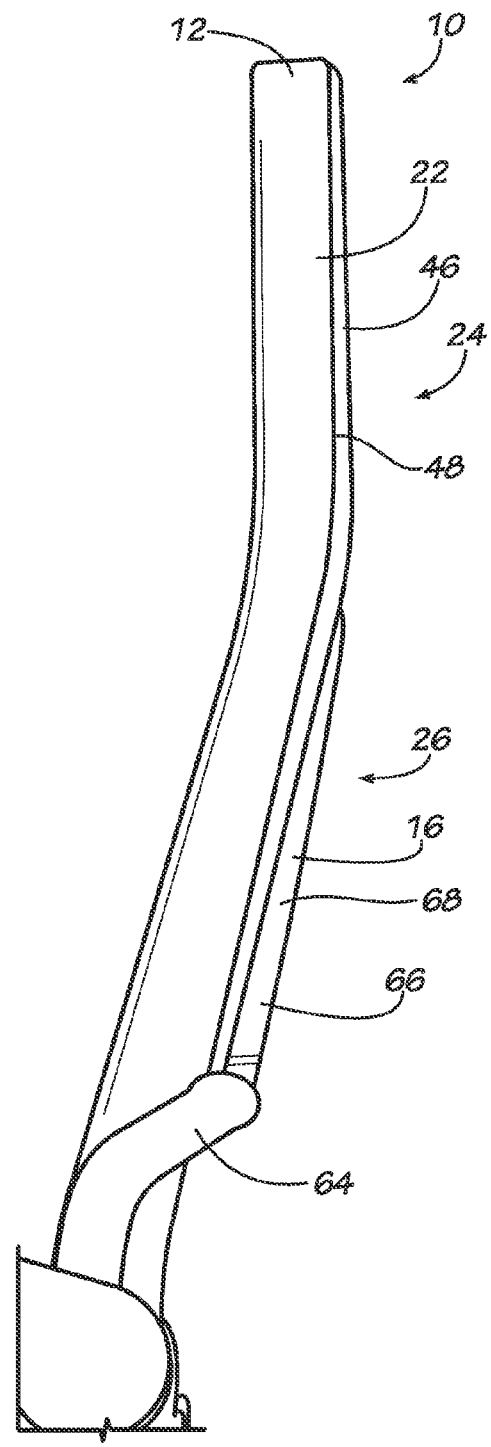
(PRIOR ART)
FIG. 4
FIG. 5

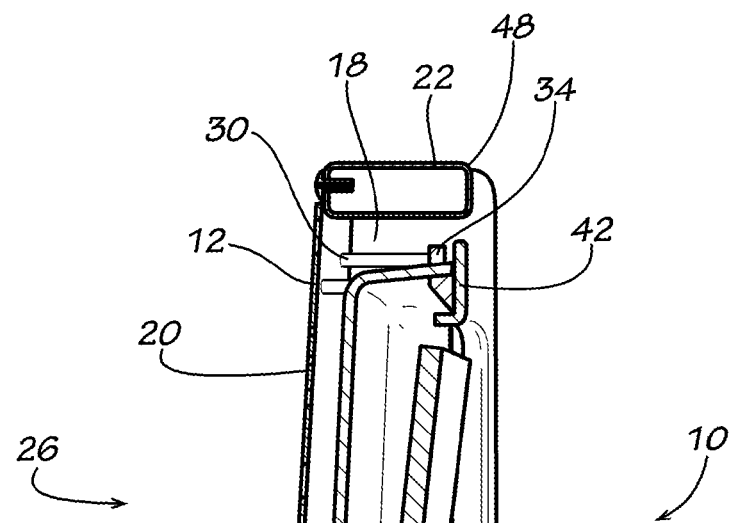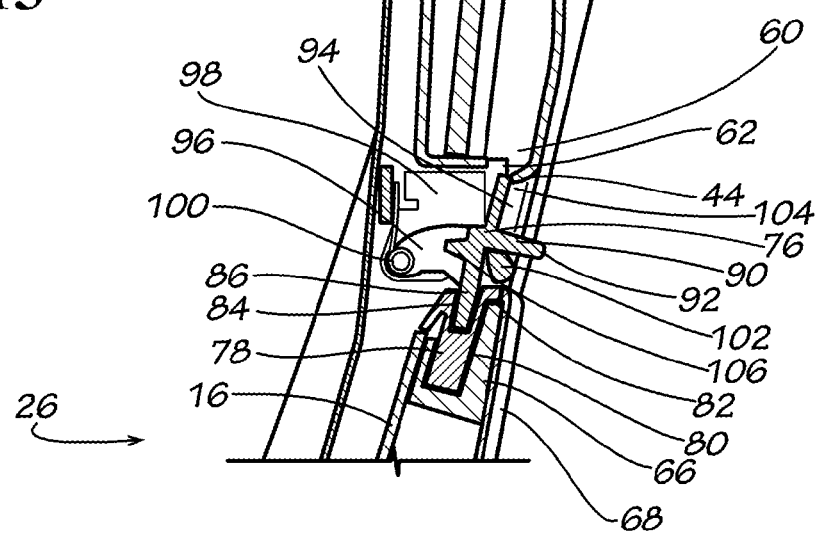
FIG. 13

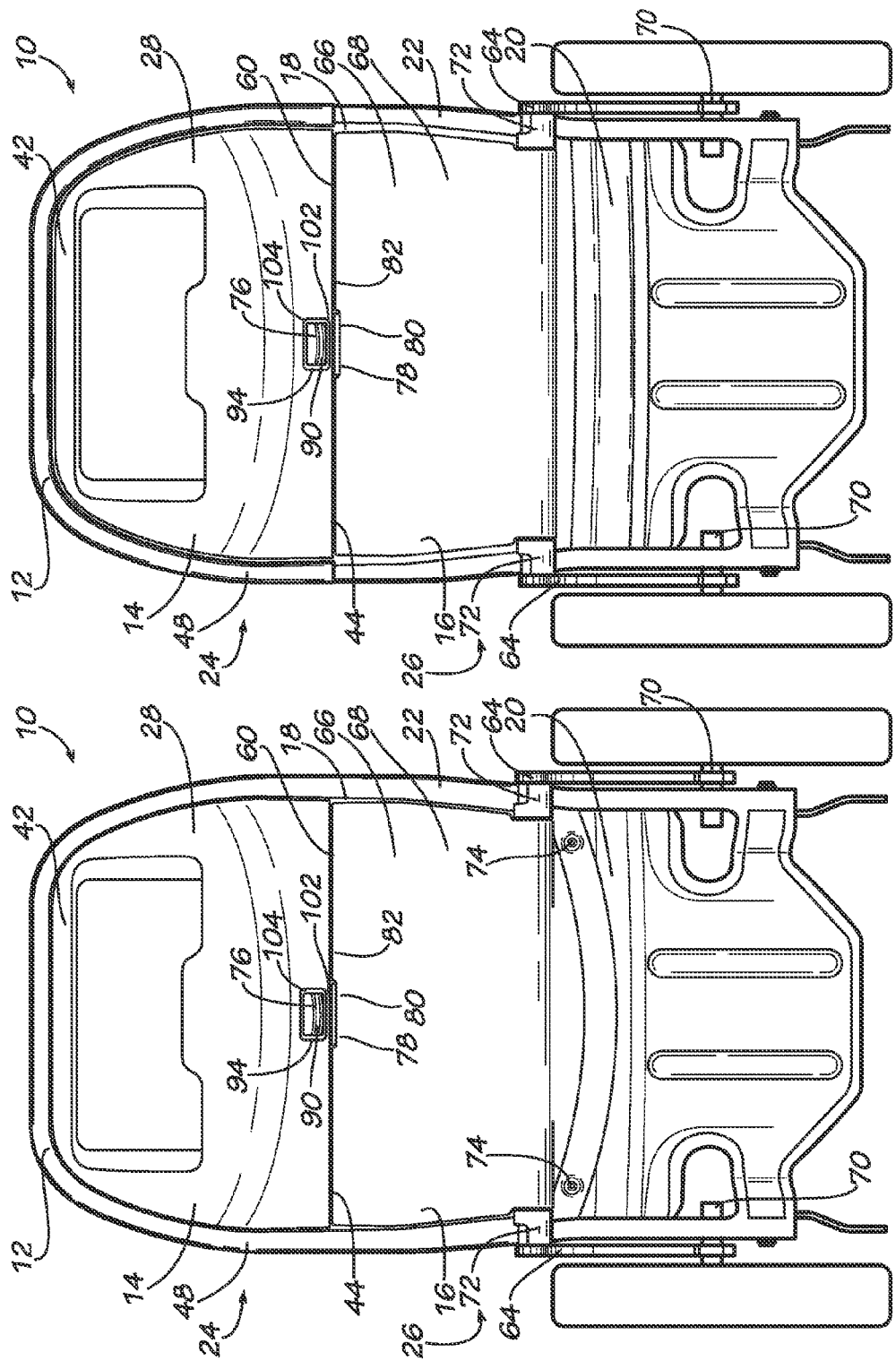

SEAT BACK ASSEMBLY

CROSS REFERENCE TO RELATED APPLICATIONS

This application is related to and claims priority benefits from U.S. Provisional Application Ser. No. 61/299,392, filed on Jan. 29, 2010, entitled SHROUD INSTALLATION AND FOOD TRAY SYSTEM INSIDE AN RECLINING SEAT-BACK FOR AIRCRAFT. The '392 application is hereby incorporated in its entirety by this reference.

FIELD OF THE INVENTION

The field of the invention relates to seat back systems for passenger seats or the like.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort and enjoyment, many passenger seat backs are utilized to install amenities for the passenger's use during the trip. For example, an upper surface of the seat back may be used to install In-Flight Entertainment ("IFE") equipment or as an area for additional storage of amenities, such as reading materials or other devices.

In some instances, a tray table may be mounted adjacent a lower surface of the seat back. The tray table is deployed by the passenger to provide a relatively flat surface for eating, working, recreation, or other uses.

Conventionally, these amenities and/or tray tables have been mounted to an exterior surface of the seat back, which often encroaches on the space available to the aft-seated passenger. In certain situations, it may be desirable to reduce the passenger space occupied by the amenities and/or by the tray table when the tray table is stowed. It may also be desirable to provide a way for the tray table to pivotally couple to the seat back in a conventional location, while minimizing the space required to stow the table body.

SUMMARY

Embodiments of the present invention include a seat back assembly comprising a seat back with a recess and a tray table assembly comprising a table body and at least one arm. In one embodiment, the table body is configured to substantially fit within the recess and is pivotally coupled to the at least one arm. The at least one arm is then pivotally coupled at a second end to a pivot shaft exterior of a location where the seat back is pivotally coupled to the pivot shaft. In other embodiments, an amenity compartment is coupled to the seat back above the tray table assembly and may be configured to also substantially fit within the recess.

In some embodiments, the amenity compartment may be a bezel or an upper literature pocket. In the embodiments where the amenity compartment is an upper literature pocket, the upper literature pocket comprises a lower surface that is positioned above an upper edge of the table body when the table body is in a stowed position. The lower surface of the upper literature pocket may comprise a plurality of slots.

In some embodiments, a latching mechanism is configured to releasably engage the tray table assembly with the amenity compartment. The latching mechanism comprises a lever coupled to a lower surface of the amenity compartment and a receptacle coupled to the table body. The latching mechanism releasably engages the tray table assembly when the projection is received by the receptacle. In some embodiments, when an external force is applied to the lever, the projection is removed from the receptacle.

The amenity compartment may be coupled to the seat back via at least one slotted bracket and at least one mounting bracket positioned on the seat back and at least one hook and at least one projection positioned on the amenity compartment. The at least one hook is engaged with the at least one slotted bracket. The amenity compartment is then rotated so that an inner surface of the amenity compartment is adjacent the at least one mounting bracket of the seat back. The at least one projection of the amenity compartment is then engaged with at least one receptacle positioned on the seat back. Additional fasteners may be used to secure a lower surface of the amenity compartment to the at least one mounting bracket.

In some embodiments, a protective covering may be positioned between the seat back and the amenity compartment. In these embodiments, the protective covering is coupled to the seat back via the coupling between the seat back and the amenity compartment without additional fasteners. The protective covering may be a full shroud, a partial shroud, or a dress cover.

BRIEF DESCRIPTION OF THE DRAWINGS

FIG. 4 is a side view of a conventional seat back assembly.

FIG. 5 is a side view of the seat back assembly of FIG. 2.

FIG. 13 is a partial cross-sectional view of the seat back assembly of FIG. 11 taken along line 13-13.

FIG. 15 is a rear view of the seat back assembly of FIG. 11 with a full shroud.

FIG. 16 is a rear view of the seat back assembly of FIG. 11 with a partial shroud.

DETAILED DESCRIPTION

Figure 1:
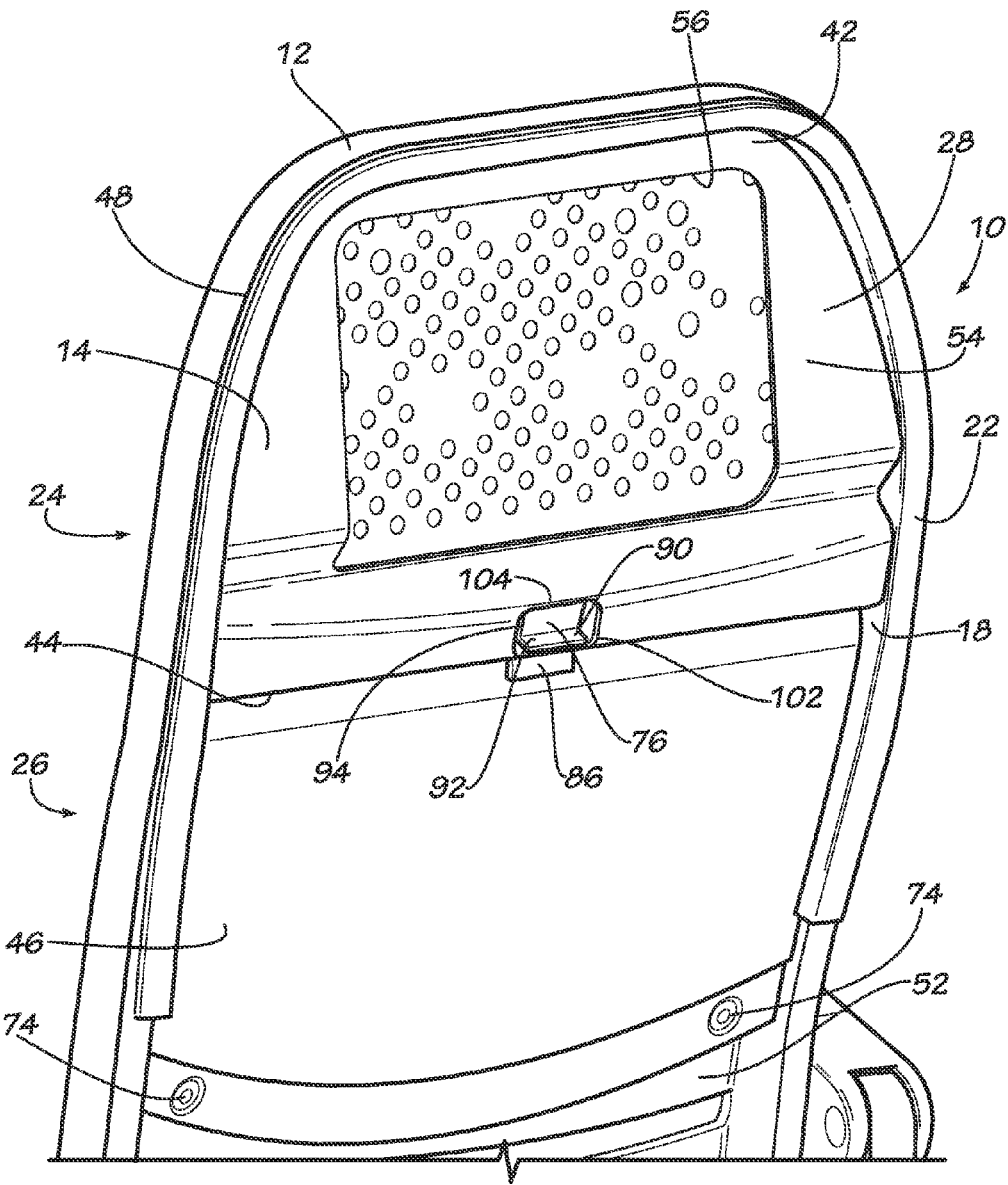
FIG. 1 is a perspective view of a seat back assembly according to one embodiment of the present invention.

Embodiments of the invention provide seat back assemblies for use with a passenger seat. While the seat back assemblies are discussed for use with aircraft seats, they are by no means so limited. Rather, embodiments of the seat back assemblies may be used in passenger seats or other seats of any type or otherwise as desired.

FIGS. 1-3 and 5-26 illustrate embodiments of a seat back assembly 10. The seat back assembly 10 comprises a seat back 12, an amenity compartment 14, and a tray table assembly 16.

The seat back 12 comprises a recess 18 that may be formed by a back surface 20 surrounded on at least three sides by a lip 22. The back surface 20 and the lip 22 may be formed of materials including but not limited to aluminum, stainless steel, other metallic materials, composite materials, or other similar materials. In these embodiments, such as the embodiments illustrated in FIGS. 1-2, 8-9, 11-12, 15-19, the recess 18 may have any suitable shape including but not limited to rectilinear, trapezoidal, parabolic, or other suitable shape that does not exceed the outer perimeter of the seat back 12. In addition, the recess 18 may have any suitable depth that does not exceed the overall thickness of the seat back 12. In some embodiments, the depth of the recess 18 may have approximately the same dimension as the thickness of the seat back 12. In other embodiments, the depth of the recess 18 may be less than the thickness of the seat back 12.

In some embodiments, the amenity compartment 14 is coupled to an upper section 24 of the recess 18, and the tray table assembly 16 is coupled to a lower section 26 of the recess 18. The amenity compartment 14 may be any suitable compartment including but not limited to an enclosure device for mounting a display or other entertainment device (also known as a bezel), an upper literature pocket, or a multi-port compartment to store additional passenger amenities. In the embodiments illustrated in FIGS. 1-3, 5-10, 17A-C, 19-26, the amenity compartment 14 is a bezel. In the embodiments illustrated in FIGS. 11-16 and 18A-C, the amenity compartment 14 is an upper literature pocket. However, one of skill in the relevant art will understand that any suitable compartment or device may be coupled to the upper section 24 of the recess 18.

The amenity compartment 14 is configured to substantially stow within the upper section 24 of the recess 18. The amenity compartment 14 may be formed of materials including but not limited to injection molded or thermoformed plastic, aluminum, sheet metal, stainless steel, other metallic materials, composite materials, or other similar materials. In these embodiments, the amenity compartment 14 is shaped to substantially conform to the shape of the upper section 24. In other embodiments, the amenity compartment 14 may have a shape that differs from the shape of the upper section 24, while still fitting within the shape of the upper section 24. For example, the upper section 24 may have a rectilinear shape, while the amenity compartment 14 may have a trapezoidal shape that fits within the rectilinear shape of the upper section 24. As a result, the amenity compartment 14 may have any suitable shape including but not limited to rectilinear, trapezoidal, parabolic, or other suitable shape that fits within the shape of the upper section 24.

Because the amenity compartment 14 is configured to substantially fit within the upper section 24 to minimize the amount of intrusion into the aft-seated passenger's space, the amenity compartment 14 may have any suitable thickness that approximates the depth of the upper section 24. In some embodiments, such as the embodiments illustrated in FIGS. 1-3 and 5-26, the pocket 14 may have any appropriate depth that allows an outer surface 28 to align substantially flush with an outer edge of the upper section 24. In other embodiments, it may be sufficient for a portion of the amenity compartment 14 to be surrounded by the upper section 24, while another portion of the amenity compartment 14 extends into the space outside the upper section 24.

In some embodiments, such as the embodiments illustrated in FIGS. 17A-19 and 22-26, the back surface 20 of the upper section 24 includes at least one slotted bracket 30 and at least one mounting bracket 32. The amenity compartment 14 includes at least one hook 34 that is configured to engage the slotted bracket 30. An inner surface 36 of the amenity compartment 14 also includes at least one projection 38. The at least one projection 38 is configured to engage at least one receptacle 40 located on the back surface 20. In some embodiments, the at least one projection 38 is a plurality of ball detents, and the at least one receptacle 40 is a plurality of ball receptacles. The receptacle 40 may be positioned on the mounting bracket 32 or may be positioned in other locations on the back surface 20. One of skill in the relevant art will understand that any suitable number and location of projections 38 and receptacles 40 may be used to secure the amenity compartment 14 to the back surface 20.

To couple the amenity compartment 14 to the seat back 12, an upper end 42 of the amenity compartment 14 is tilted into the seat back 12 so that the hook 34 is inserted into the slotted bracket 30. The amenity compartment 14 is then rotated so that an inner surface 36 of the amenity compartment 14 is adjacent the mounting bracket 32 and the at least one projection 38 engages with the at least one receptacle 40. In the embodiments illustrated in FIGS. 17A-C, 19, and 22-26, the mounting bracket 32 is configured to couple with the inner surface 36 of the bezel 14. In other embodiments, the mounting bracket 32 may have any suitable shape or configuration that allows the mounting bracket 32 to couple with the inner surface 36 of the amenity compartment 14 based on the particular configuration and/or type of amenity to be housed within the amenity compartment 14.

The hook/slotted bracket coupling and the projection/receptacle coupling allow the amenity compartment 14 to snap into place on the seat back 12. One of skill in the relevant art will understand that other suitable snap-fit designs or other suitable mechanical fasteners may be used to couple the amenity compartment 14 to the seat back 12. The method of assembly allows for easy installation and removal of the amenity compartment 14.

The amenity compartment 14 may also be secured to the mounting bracket 32 via mechanical fasteners 108 that are inserted through a lower surface 44 of the amenity compartment 14. The mechanical fasteners 108 ensure that tools are needed to remove the amenity compartment 14 to prevent tampering during flight and provide additional security for the amenity compartment 14.

Figure 18A:
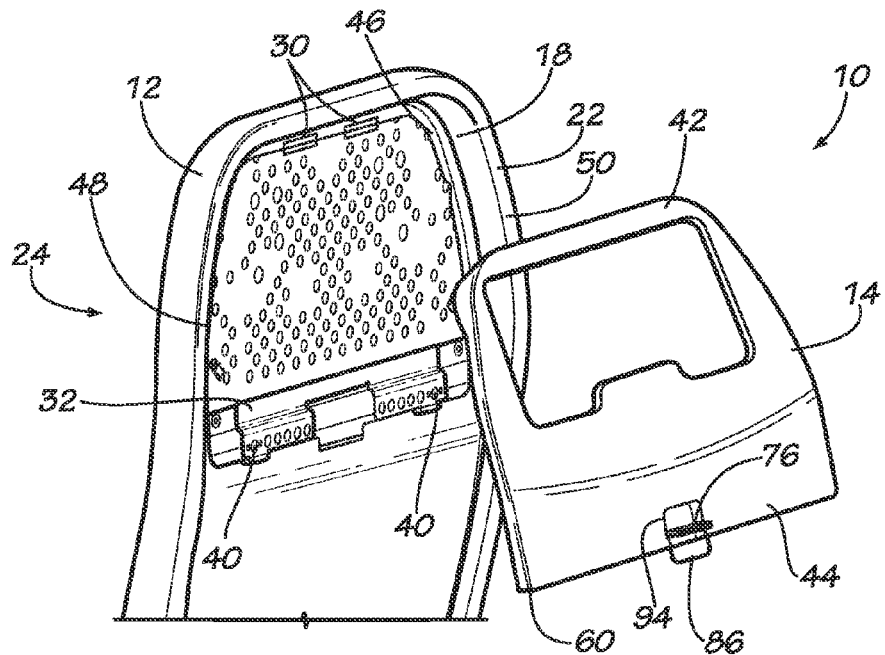
FIG. 18A is a partially exploded perspective view of the seat back assembly of FIG. 11 without a tray table assembly.
Figure 18B:
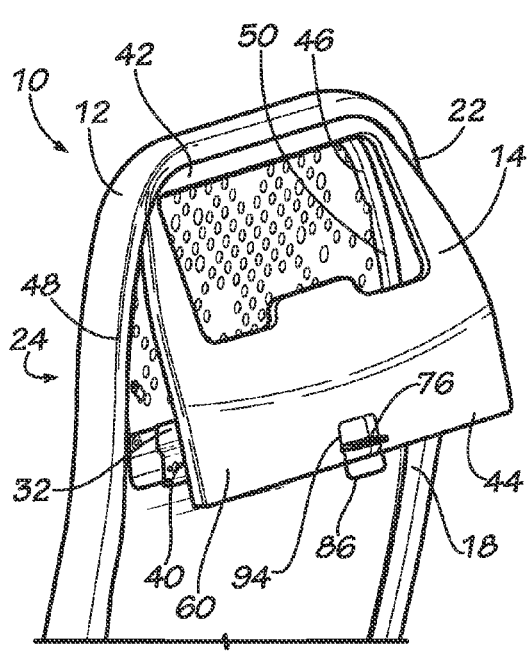
FIG. 18B is a partially assembled perspective view of the seat back assembly of FIG. 11 without a tray table assembly.
Figure 18C:
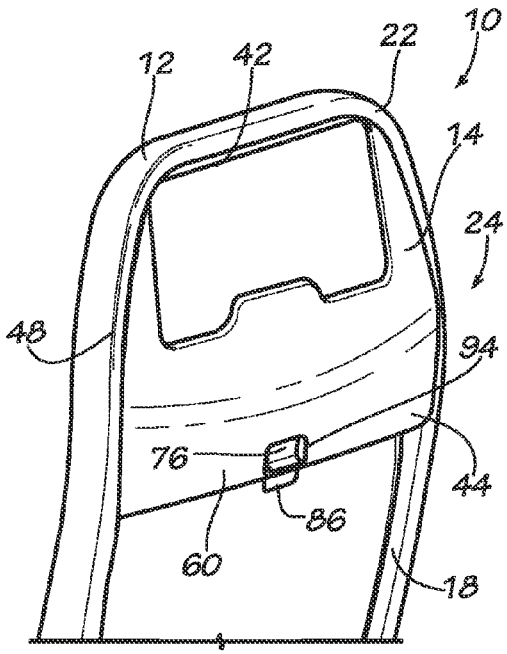
FIG. 18C is an assembled perspective view of the seat back assembly of FIG. 11 without a tray table assembly.
Figure 19:
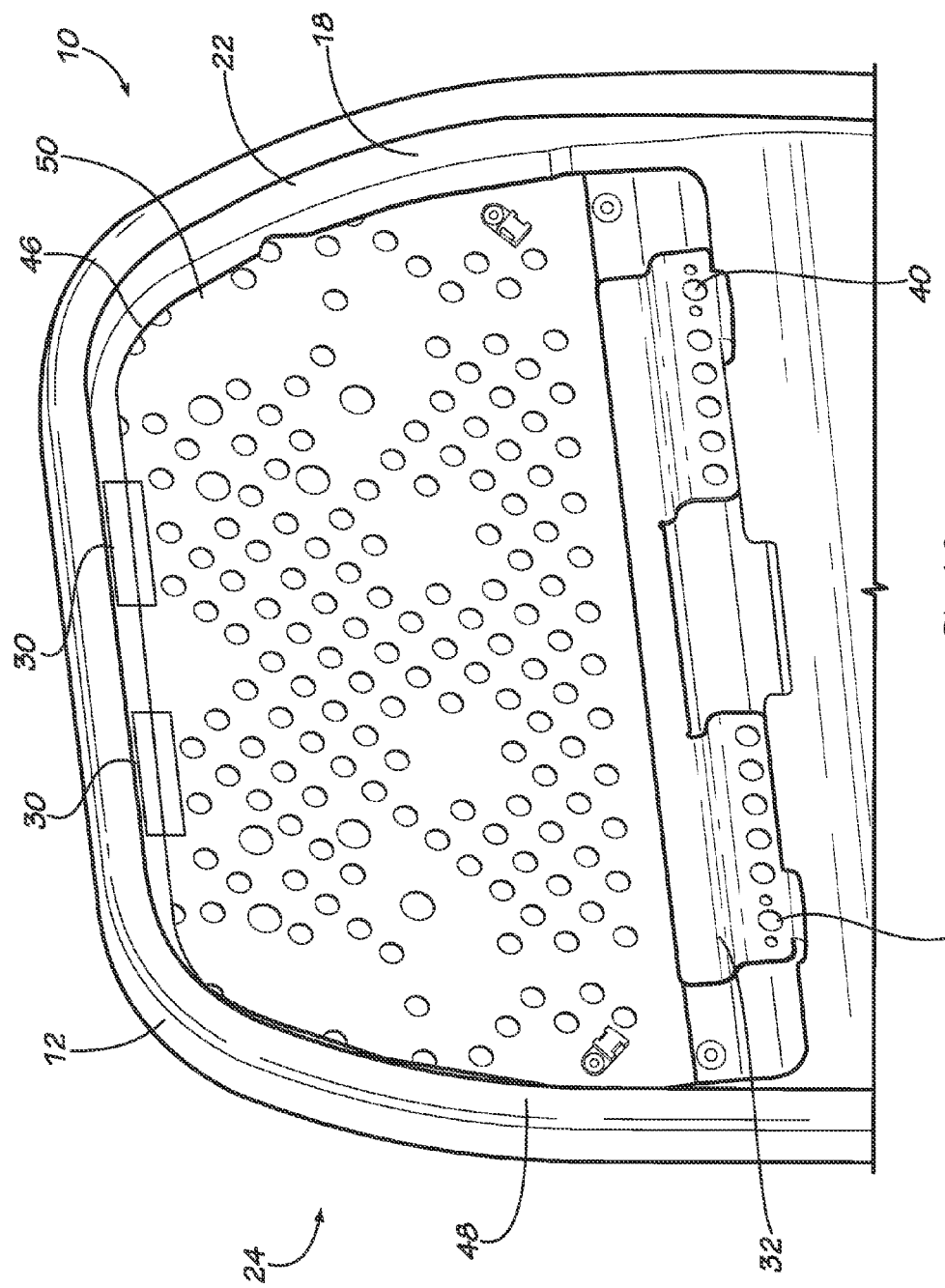
FIG. 19 is a partial perspective view of the seat back and shroud of the seat back assembly of FIG. 1.
Figure 20:
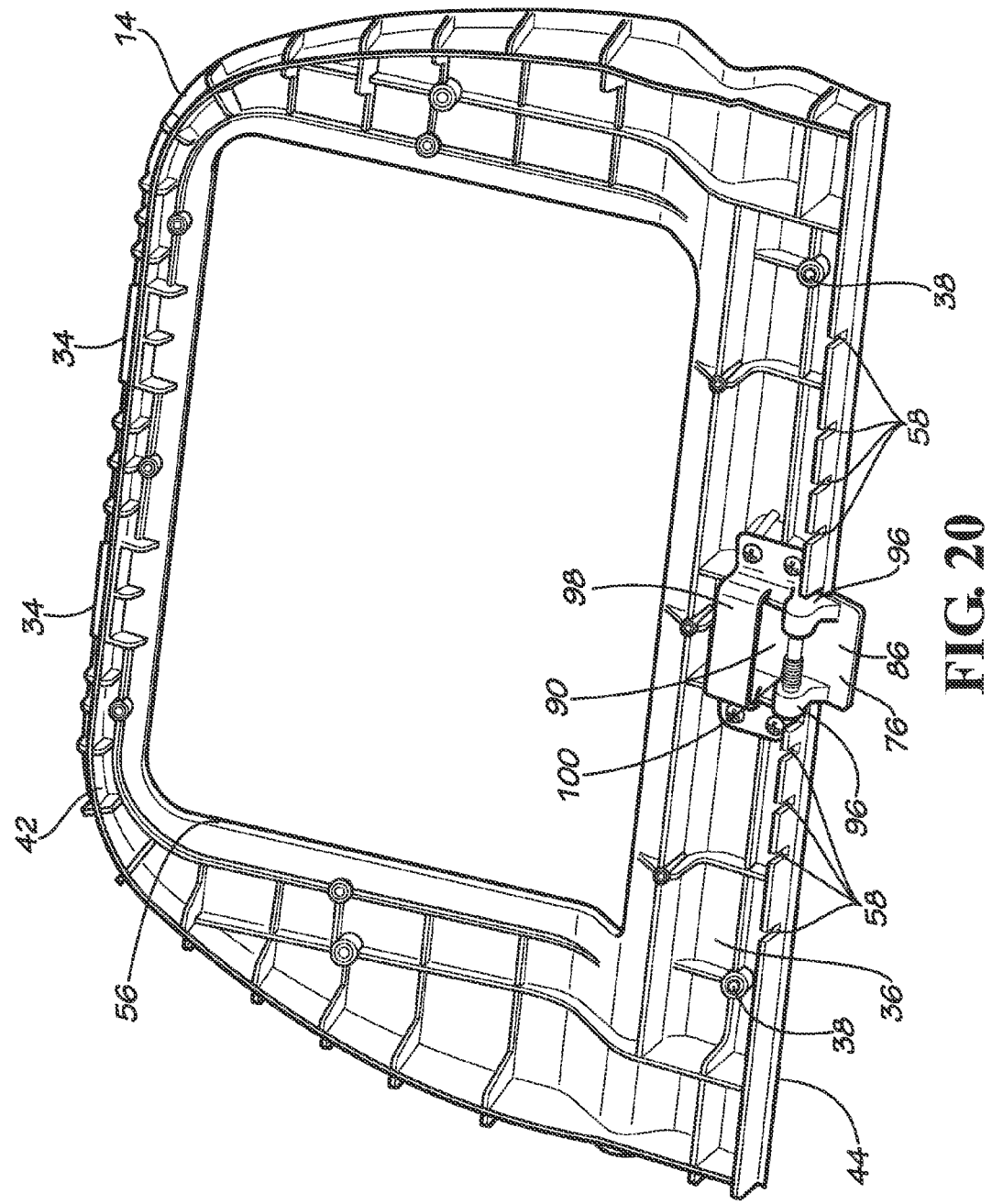
FIG. 20 is a perspective view of the amenity compartment of the seat back assembly of FIG. 1.
Figure 21:
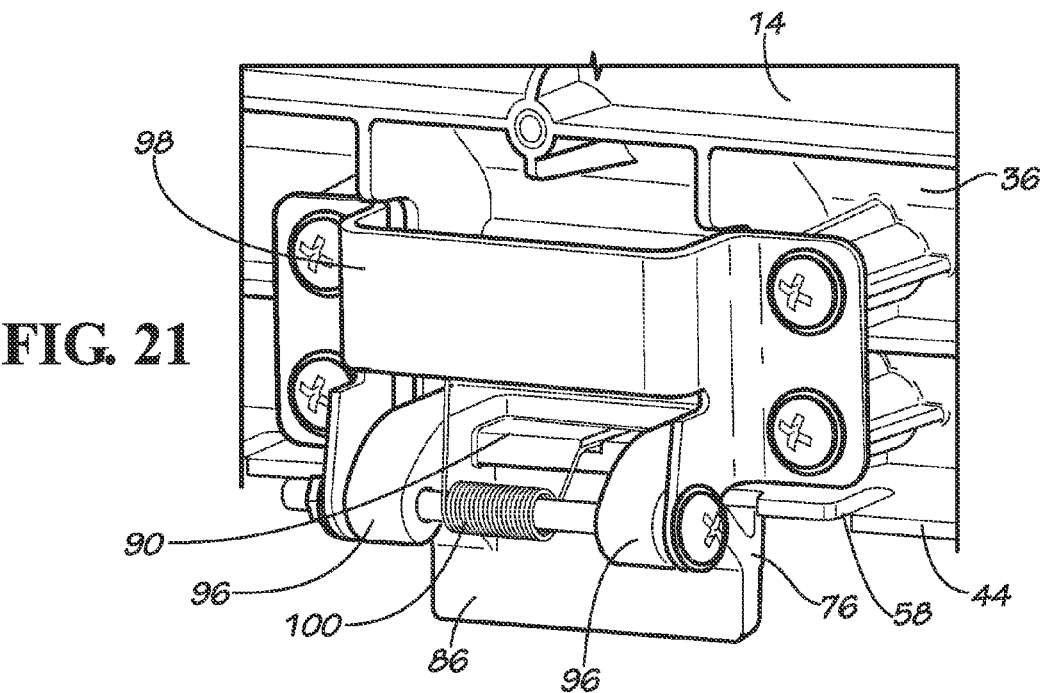
FIG. 21 is a partial perspective view of the amenity compartment of the seat back assembly of FIG. 1.
Figure 22:
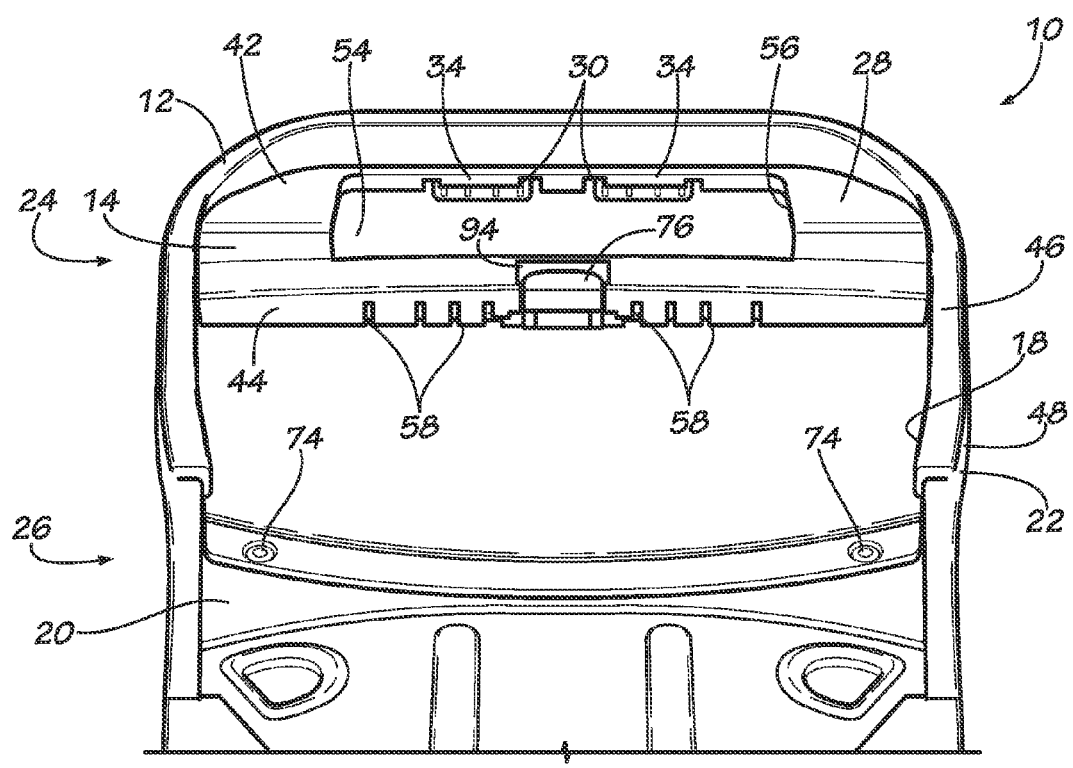
FIG. 22 is a bottom perspective view of the seat back assembly of FIG. 1.
Figure 23:
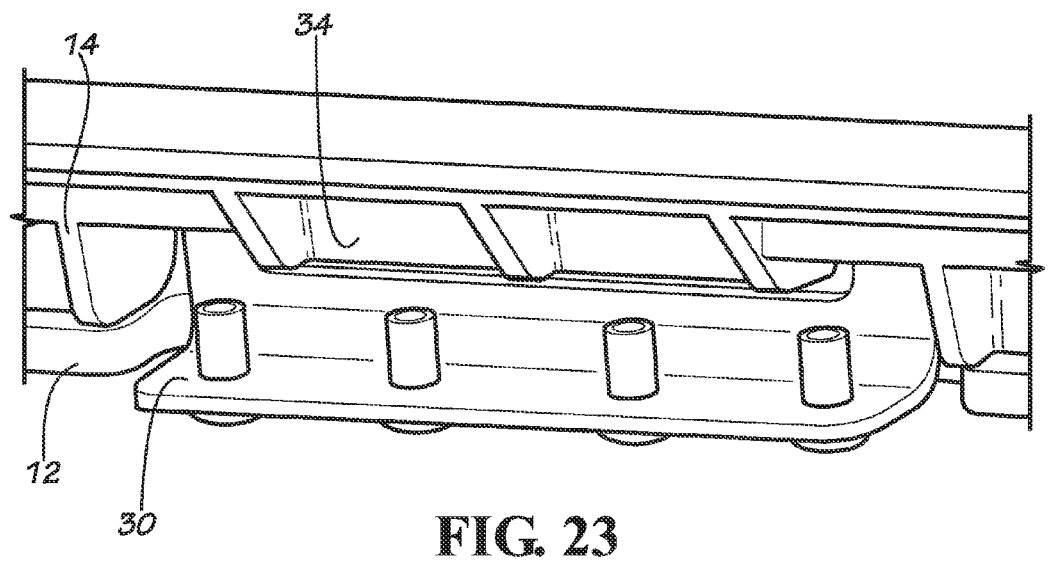
FIG. 23 is a partial bottom perspective view of the slotted bracket of the seat back assembly of FIG. 1.
Figure 24:
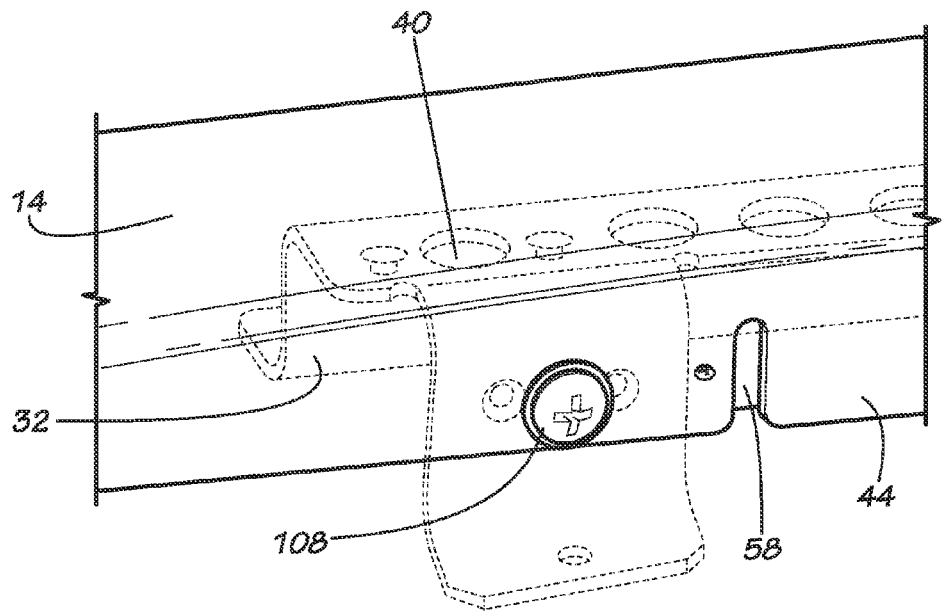
FIG. 24 is a partial bottom perspective view of the mounting bracket of the seat back assembly of FIG. 1.
Figure 25:
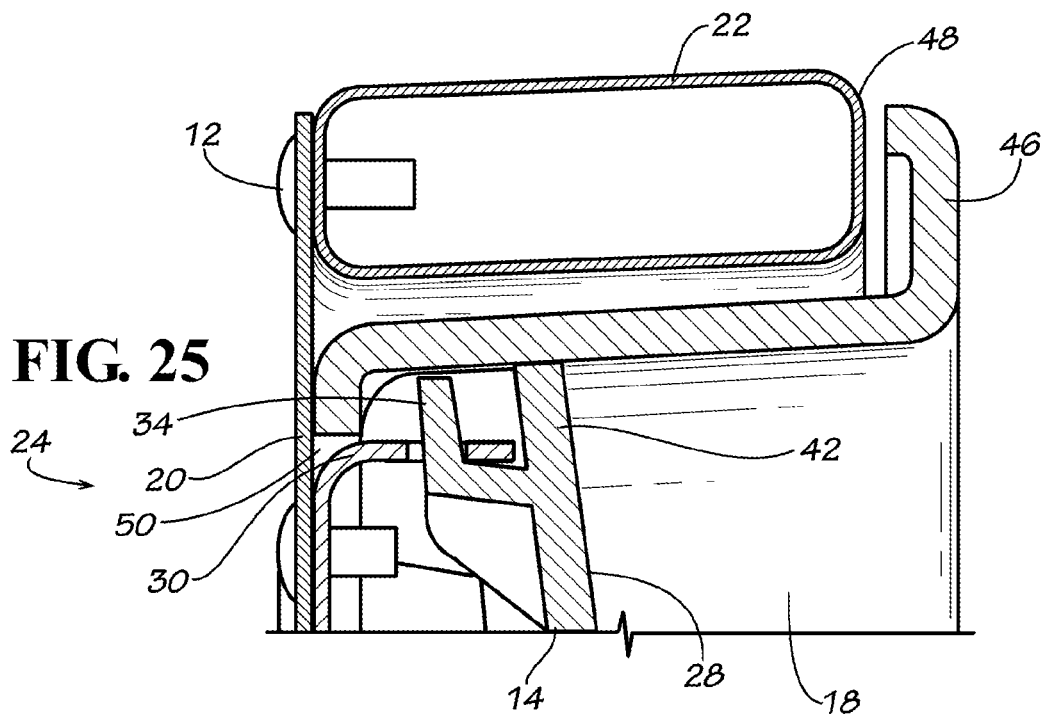
FIG. 25 is a cross-sectional perspective view of the seat back assembly of FIG. 2 taken along line 25-25.
Figure 26:
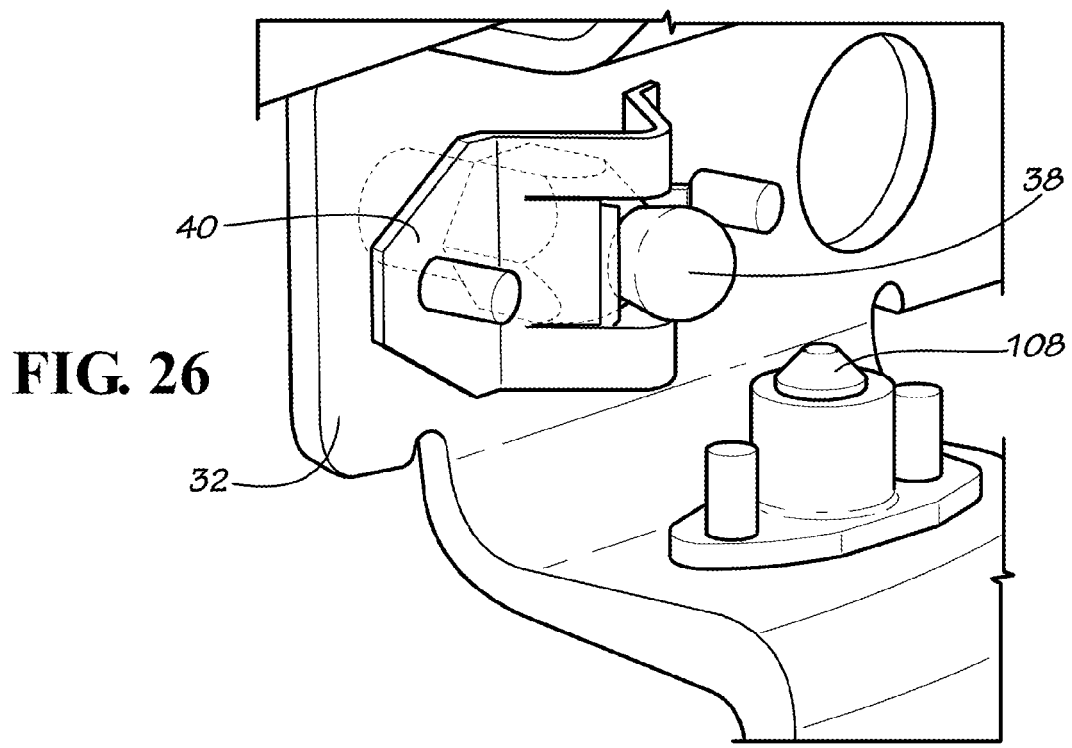
FIG. 26 is a interior perspective view of the mounting bracket of the seat back assembly of FIG. 1.

FIGS. 17A-18C illustrate methods of coupling the amenity compartment 14 to the back surface 20 and demonstrate that the method is the same whether the amenity compartment 14 is a bezel (FIGS. 17A-17C) or a pocket (FIGS. 18A-18C). The method is also the same for other embodiments of the amenity compartment 14.

In some embodiments, a shroud 46 may be installed between the amenity compartment 14 and the seat back 12. The shroud 46 is typically formed of a material that resists stains and is easily and quickly sanitized between passenger uses. Suitable materials for forming the shroud include but are not limited to plastics (vacuformed, injection molded, or thermoformed), such as polycarbonate, polyethylene, polypropylene, polyvinyl chloride, or other similar plastics, metallic materials, composite materials, or other similar materials. As a result, the shroud 46 provides a protective covering for at least a portion of the seat back 12.

In these embodiments, the shroud 46 is coupled to at least a portion of the seat back 12. The shroud 46 is shaped to substantially conform to at least an outer perimeter of the upper section 24 and an aft surface 48 of the lip 22 (partial shroud embodiment). The shroud 46 may optionally extend downward to also substantially conform to the back surface 20 of a lower section 26 of the recess 18 and the aft surface 48 of the lip 22 (full shroud embodiment). Any portions of the back surface 20 not covered by the shroud 46 are typically enclosed with a dress cover 52.

The portion of the shroud 46 located in the upper section 24 is shaped to cover the outer perimeter shape of the upper section 24, but may include an aperture 50 in the region behind the amenity compartment 14. The shroud 46 material is not included behind the amenity compartment 14 because it does not provide additional aesthetic or protective benefit and adds unnecessary weight to the shroud 46. The aperture 50 also provides an area through which the slotted bracket 30 and the mounting bracket 32 may extend to couple with the amenity compartment 14. The shroud 46 is pulled snugly against the back surface 20 by the coupling of the amenity compartment 14 to the upper section 24 without the need for additional fasteners. In the full shroud embodiment, as illustrated in FIGS. 1-3, 15, and 22, additional fasteners 74 may be used to secure the shroud 46 to the lower section 26 of the recess 18.

In the embodiments illustrated in FIGS. 1-3, 8, 17A-C, and 19, the shroud 46 is configured to couple between the seat back 12 and the bezel 14. In other embodiments, the shroud 46 may have any suitable shape or configuration that allows the shroud 46 to couple between the seat back 12 and the amenity compartment 14 based on the particular configuration and/or type of amenity to be housed within the amenity compartment 14.

In other embodiments, the dress cover 52 may be installed between the amenity compartment 14 and the seat back 12 using the same amenity compartment 14 design that is used when the shroud 46 is positioned between the amenity compartment 14 and the seat back 12. The dress cover 52 may be formed of materials including but not limited to leather, fabric, or other similar upholstery materials. The dress cover 52 is shaped to cover substantially all of the back surface 20. The dress cover 52 is pulled snugly against the back surface 20 by the coupling of the amenity compartment 14 to the upper section 24 without the need for additional fasteners. In some embodiments, the dress cover 52 and back surface 20 may include hook and loop type fasteners to further secure the dress cover 52 to the back surface 20. The dress cover 52 may also include apertures (not shown) through which the slotted bracket 30 and the mounting bracket 32 may extend to couple with the amenity compartment 14.

In the embodiments where the amenity compartment 14 is a bezel, such as the embodiments illustrated in FIGS. 1-2, 8-9, and 17A-C, the bezel 14 is configured to form an enclosure 54 between the back surface 20 and the outer surface 28. The enclosure 54 is shaped to secure a display for an IFE or other entertainment devices, including but not limited to displays manufactured by Panasonic, Thales, or other manufacturers. The outer surface 28 also includes an aperture 56 to ensure that the display is visible when positioned within the enclosure 54. In some embodiments, the outer surface 28 is angled so that the display is tilted upward for better viewing by a passenger seated in the passenger located aft of the seat back 12.

Figure 2:
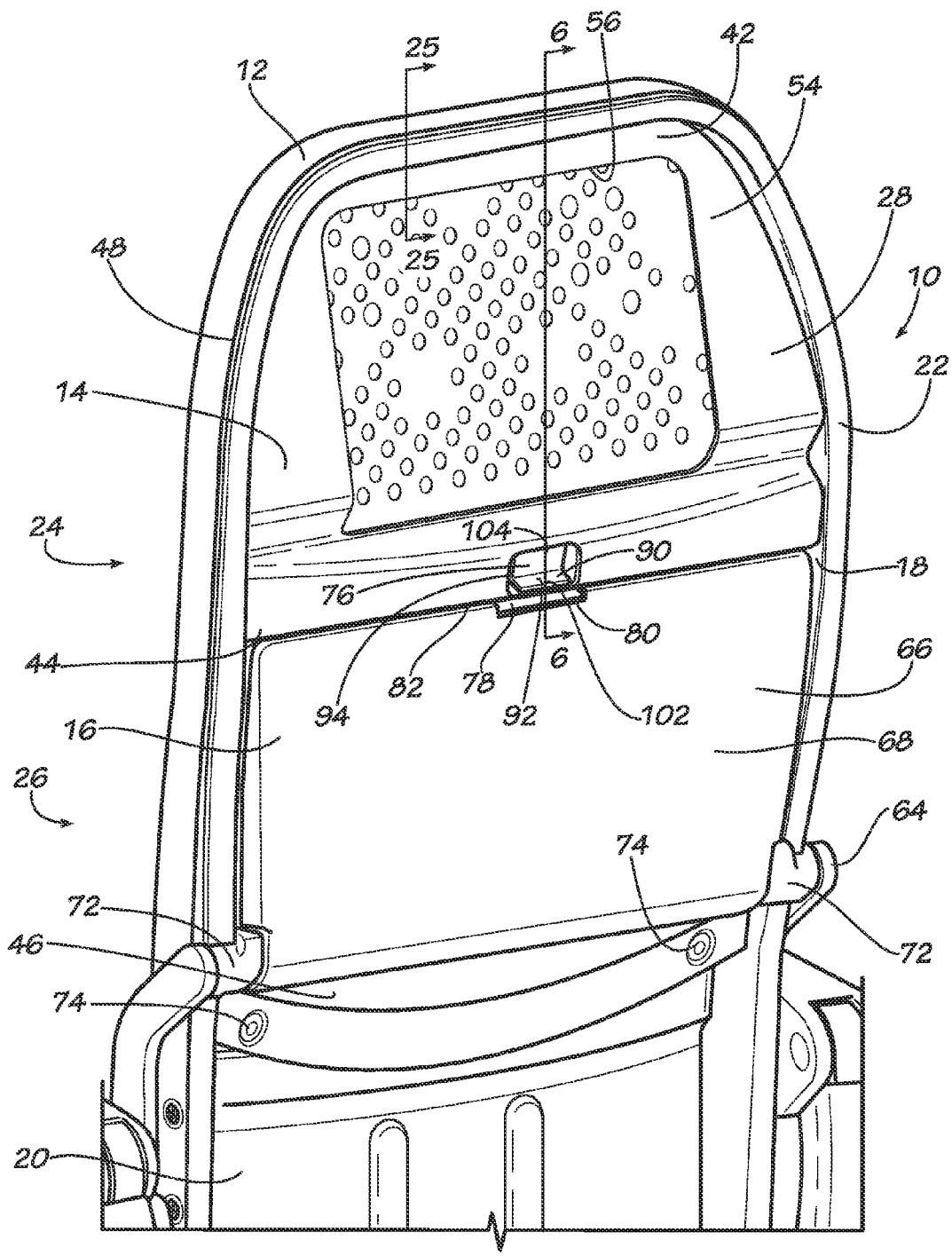
FIG. 2 is a perspective view of the seat back assembly of FIG. 1 with a tray table assembly in a stowed position.
Figure 3:
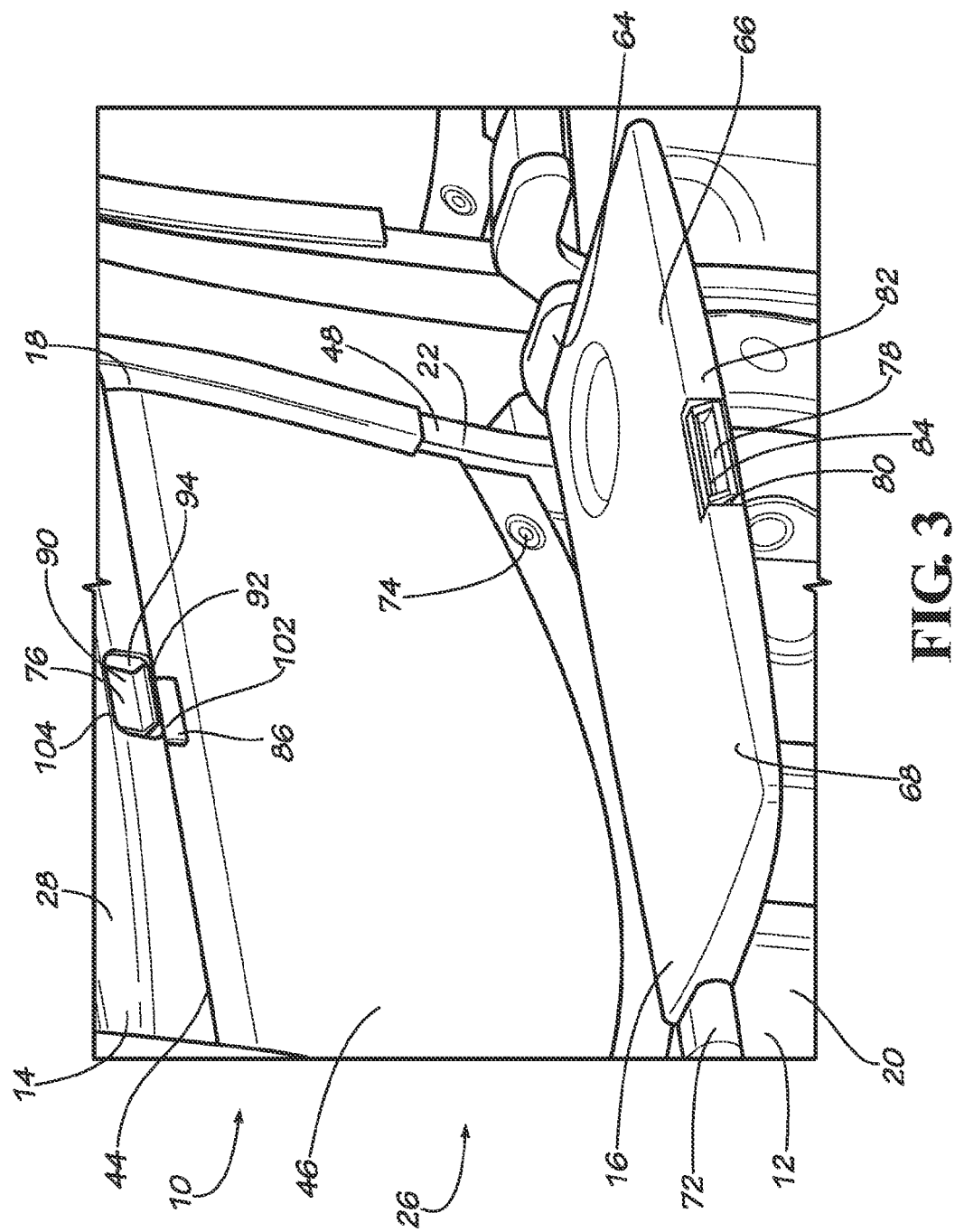
FIG. 3 is a partial perspective view of the seat back assembly of FIG. 2 with the tray table assembly in a deployed position.
Figure 6:
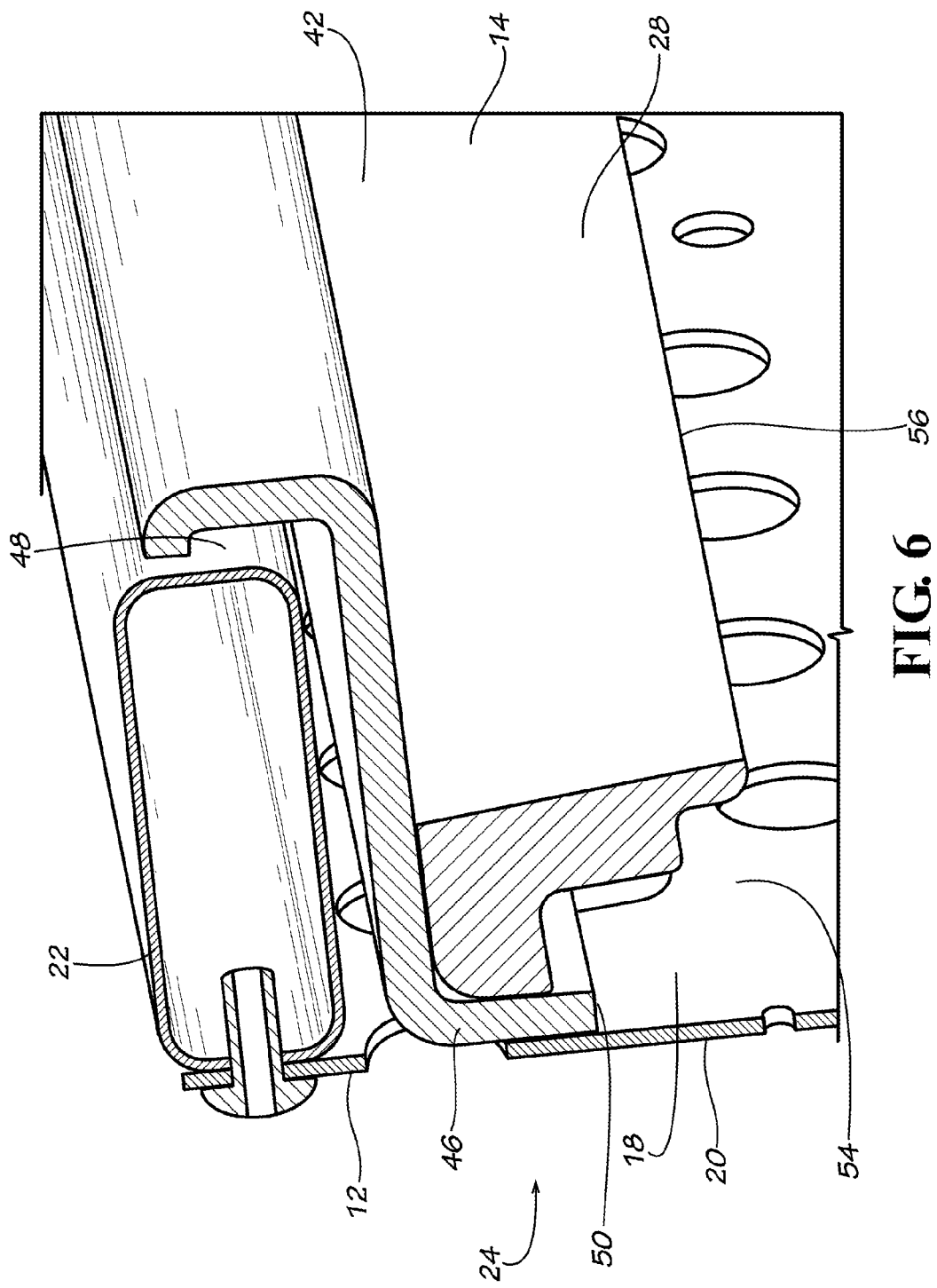
FIG. 6 is a partial cross-sectional perspective view of the seat back assembly of FIG. 2 taken along line 6-6.
Figure 7:
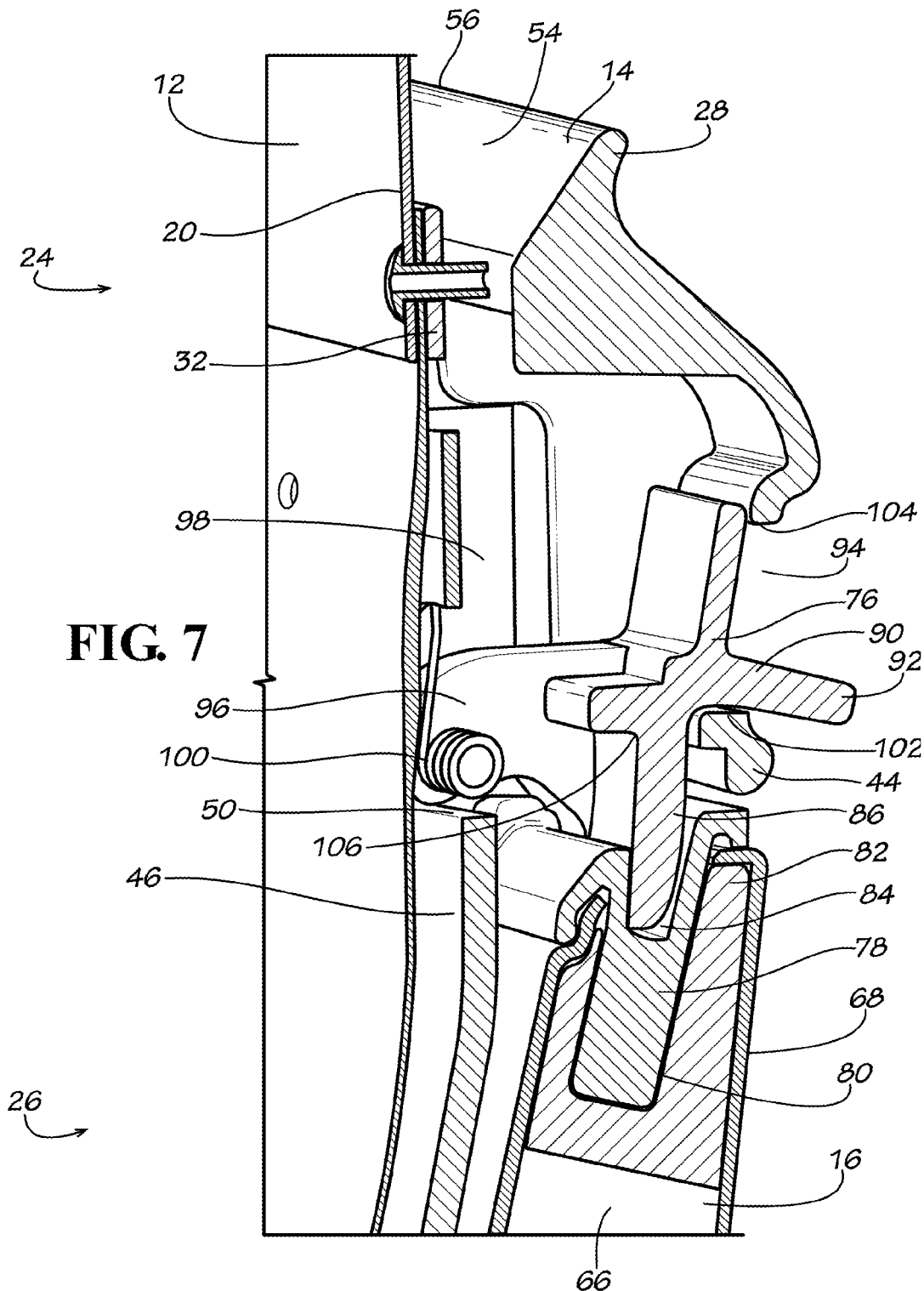
FIG. 7 is a partial cross-sectional perspective view of the seat back assembly of FIG. 2 taken along line 6-6.
Figure 8:
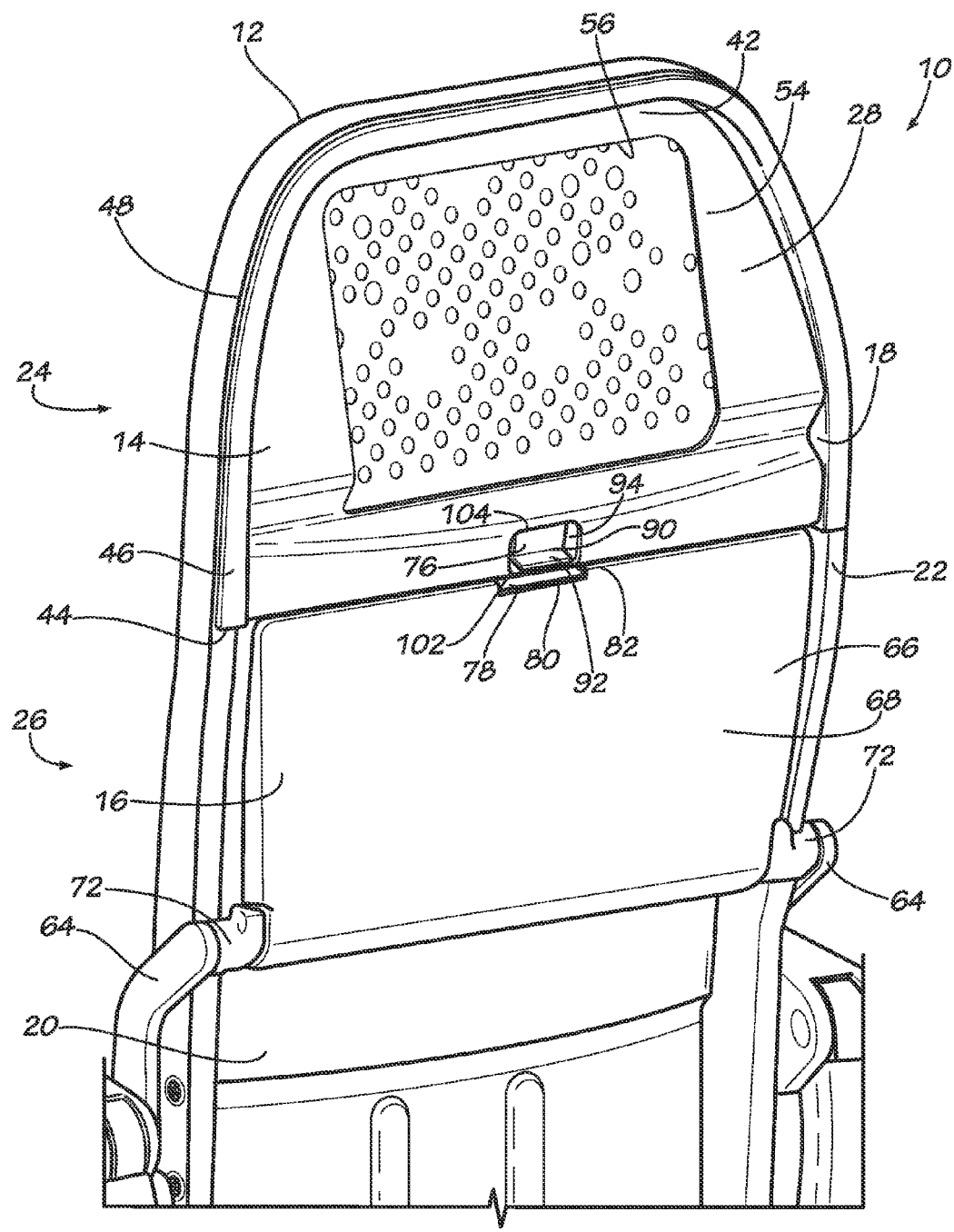
FIG. 8 is a perspective view of the seat back assembly of FIG. 2 with a partial shroud.
Figure 9:
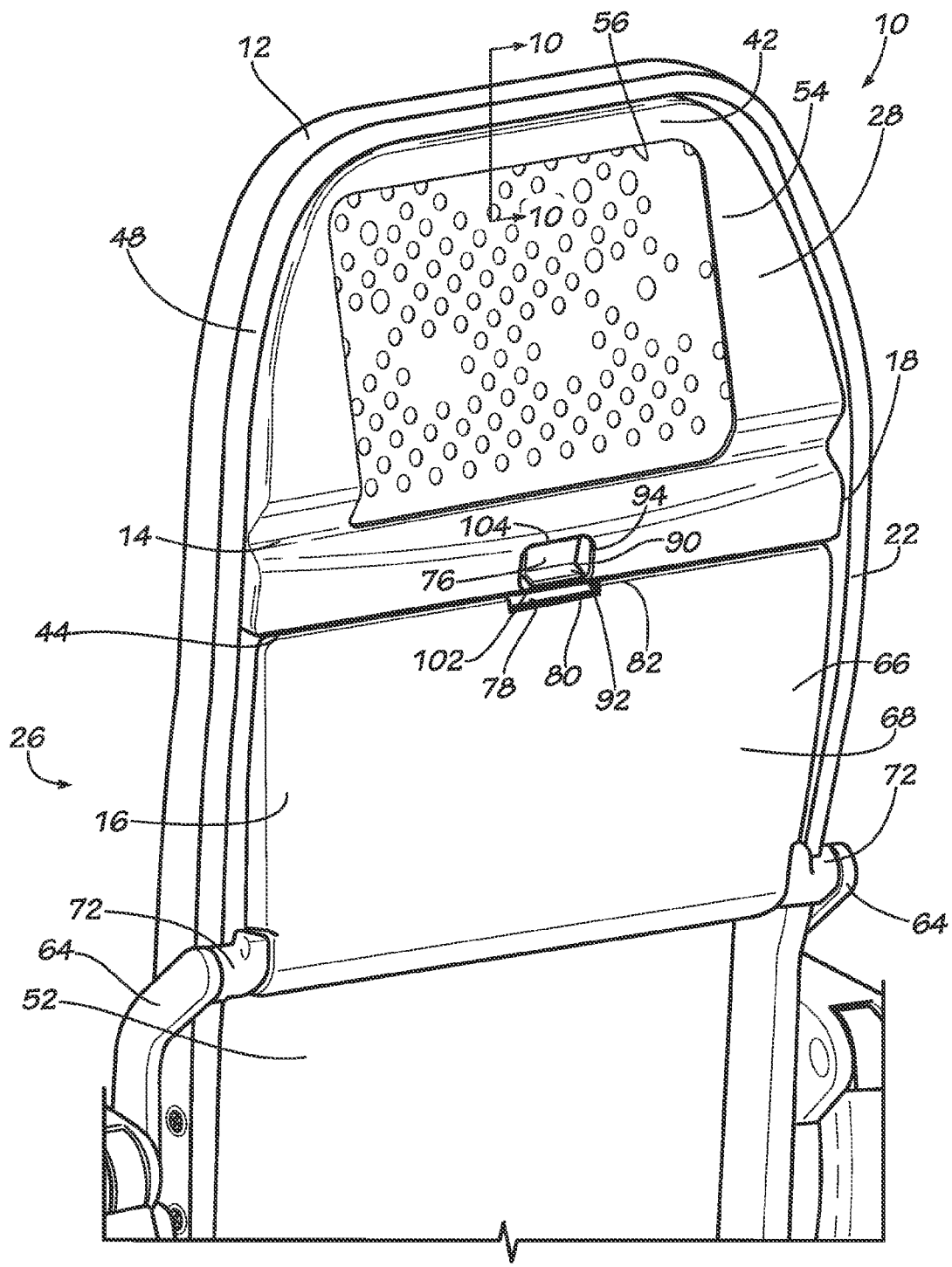
FIG. 9 is a perspective view of the seat back assembly of FIG. 2 with no shroud.
Figure 10:
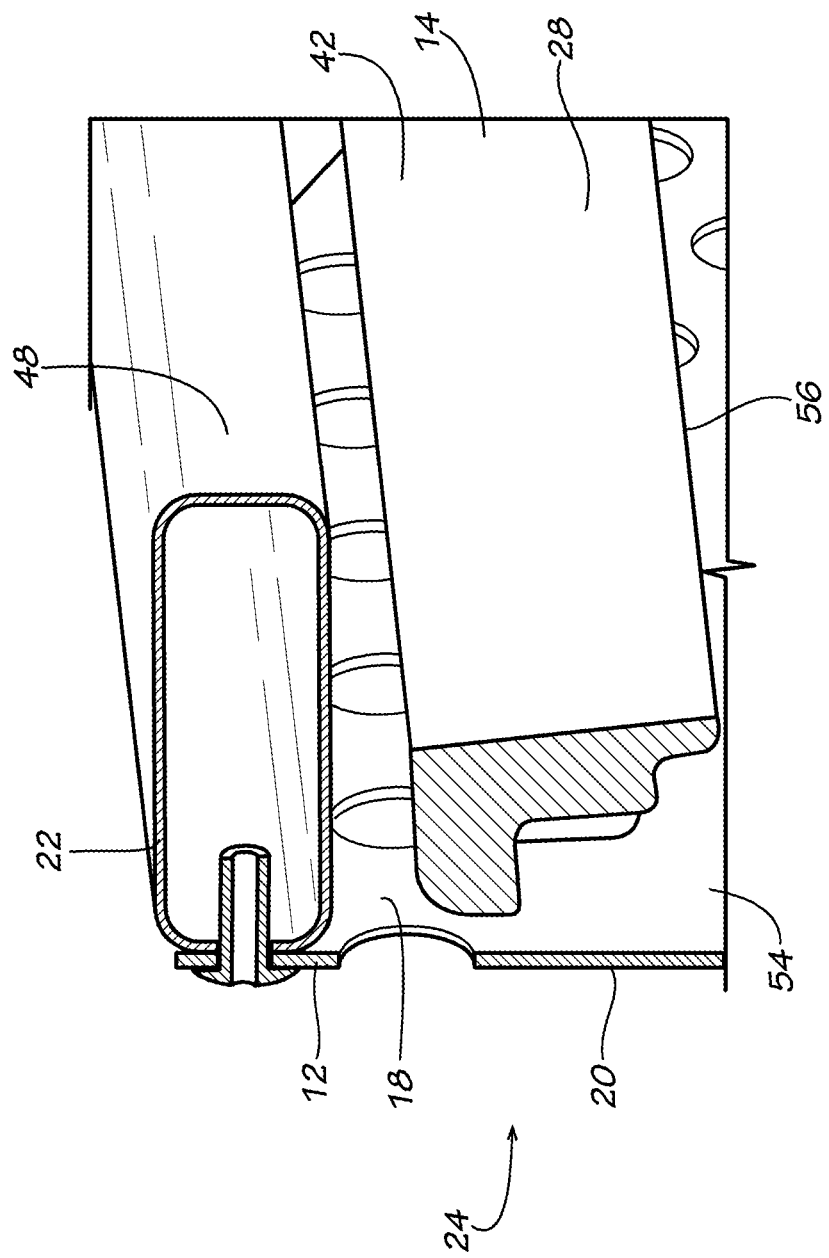
FIG. 10 is a partial cross-sectional perspective view of the seat back assembly of FIG. 9 taken along line 10-10.

The bezel 14 may include slots 58 in the lower surface 44 for passive cooling of the IFE display. To improve cooling of the IFE display, the bezel 14 is often used in combination with the shroud 46. FIG. 8 illustrates the use of the bezel 14 in combination with the partial shroud 46 embodiment. FIGS. 1-3 illustrate the use of the bezel 14 in combination with the full shroud 46 embodiment. In some instances, depending on the type of device being secured and the amount of heat generated by that device, the bezel 14 may also be used in combination with the dress cover 52 only, as illustrated in FIG. 9.

In the embodiments where the amenity compartment 14 is an upper literature pocket, such as the embodiments illustrated in FIGS. 11-16 and 18A-C, the pocket 14 is configured so that the entire pocket 14 is located above the tray table assembly 16. In these embodiments, the pocket 14 is shaped to hold literature in a sideways or "landscape" orientation. The sideways orientation of the pocket 14 allows the pocket 14 to have a shorter length, which in turn provides additional space to maximize the length of the tray table assembly 16 without an edge 82 of the tray table assembly 16 overlapping a lower end 60 of the pocket 14. In some embodiments, such as the embodiment illustrated in FIG. 14, the lower end 60 of the pocket 14 is formed by a plurality of slots 62. The slots 62 allow dirt and debris inside the pocket 14 to fall to the floor, thus preventing particle entrapment within the pocket 14.

Figure 11:
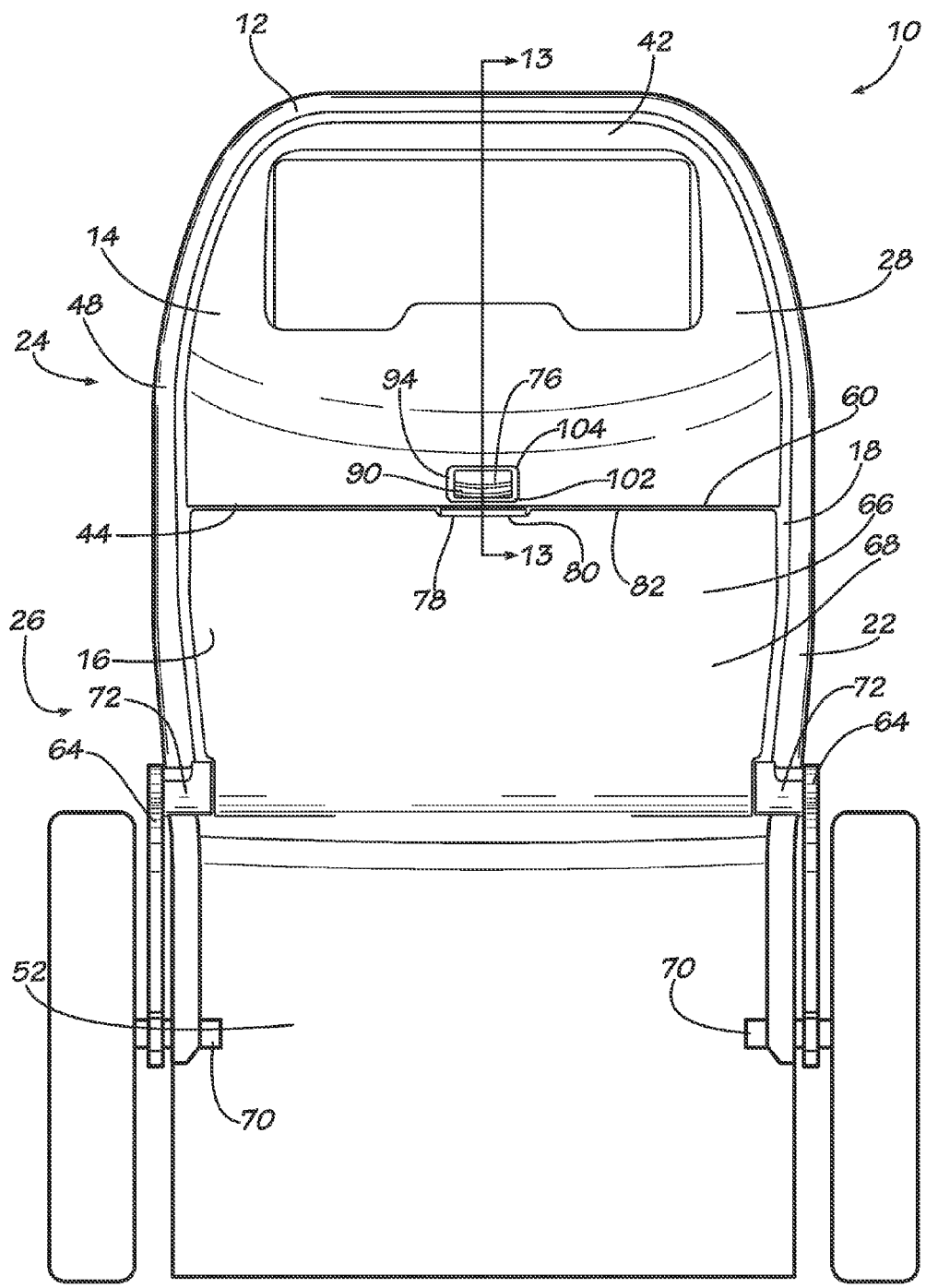
FIG. 11 is a rear view of the seat back assembly according to an alternative embodiment of the present invention.
Figure 12:
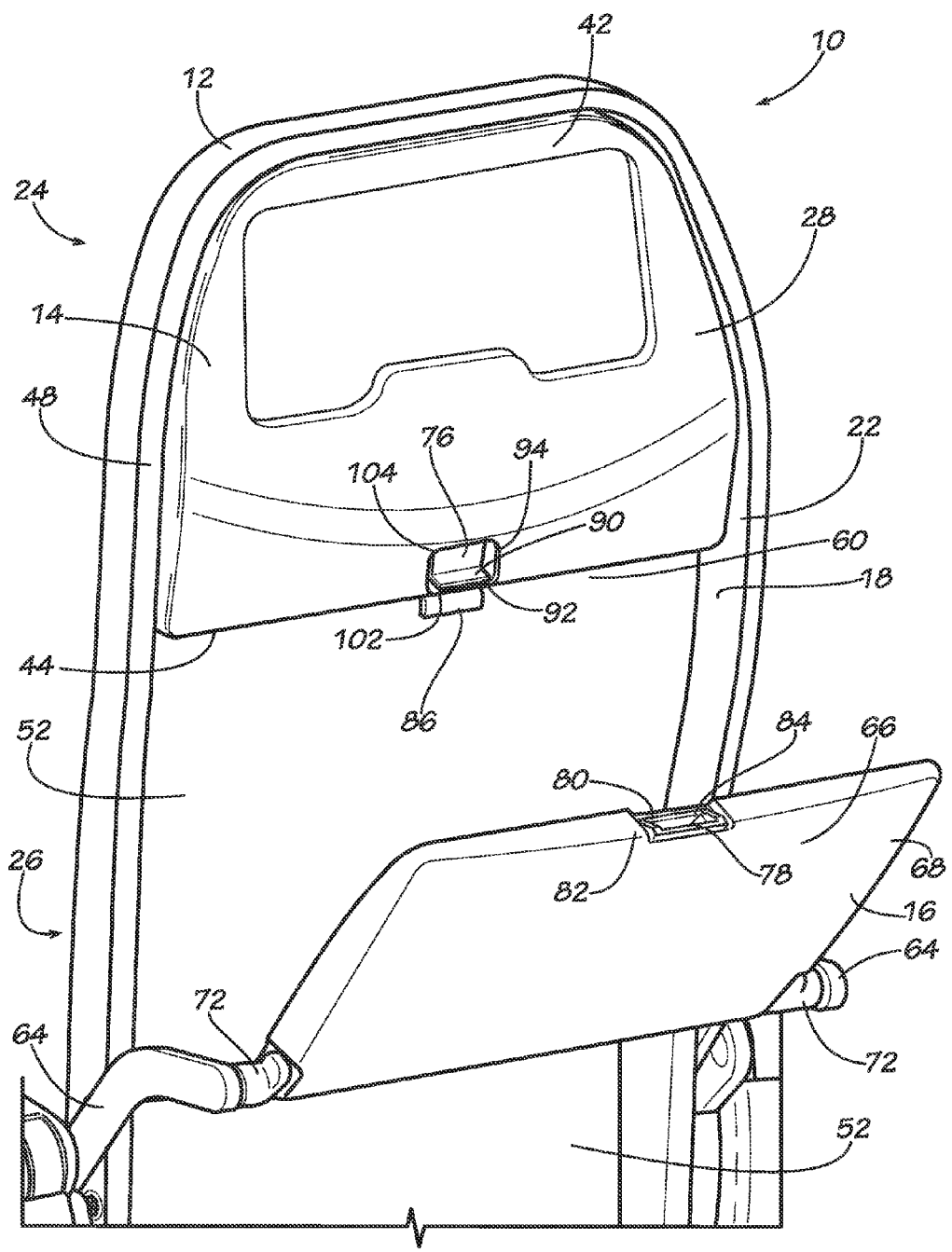
FIG. 12 is a perspective view of the seat back assembly of FIG. 11 with a tray table in a partially deployed position.
Figure 14:
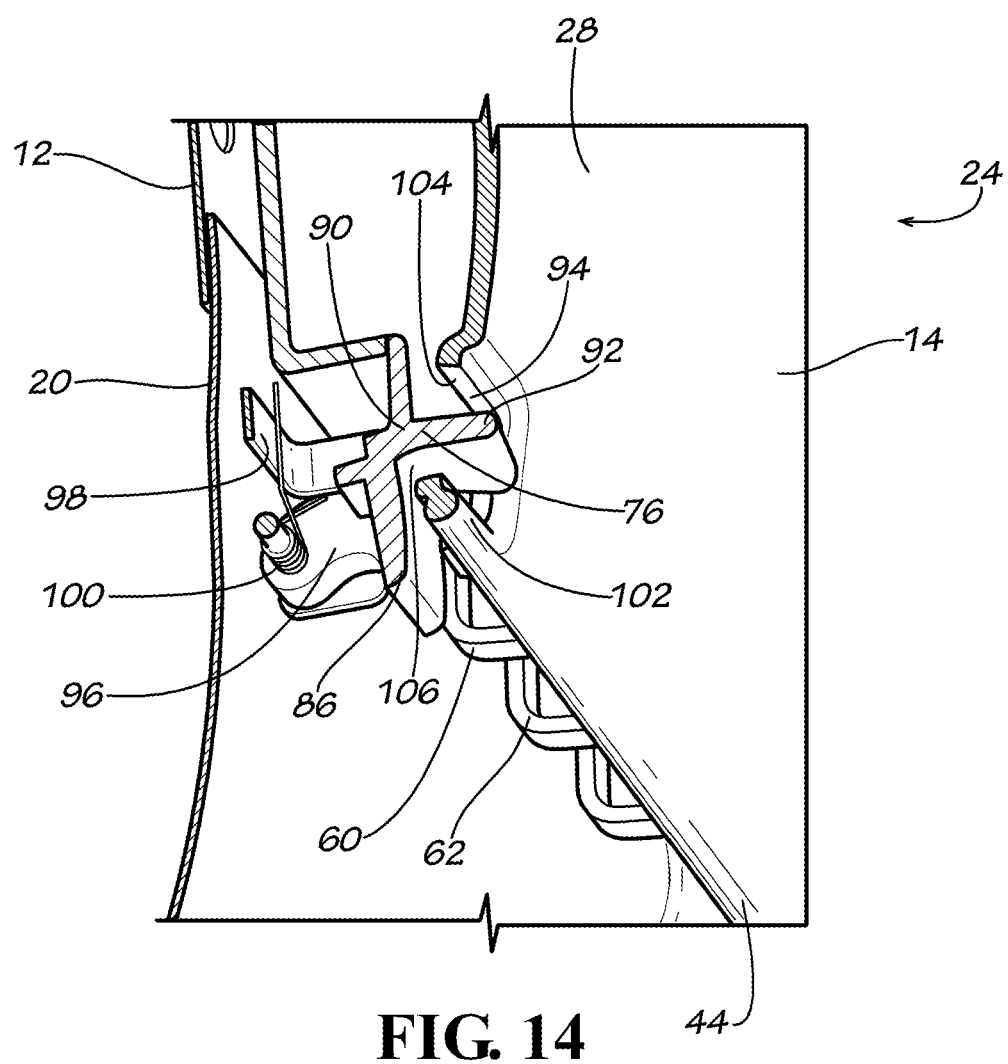
FIG. 14 is a partial cross-sectional perspective view of the seat back assembly of FIG. 11 taken along line 13-13.
Figure 17A:
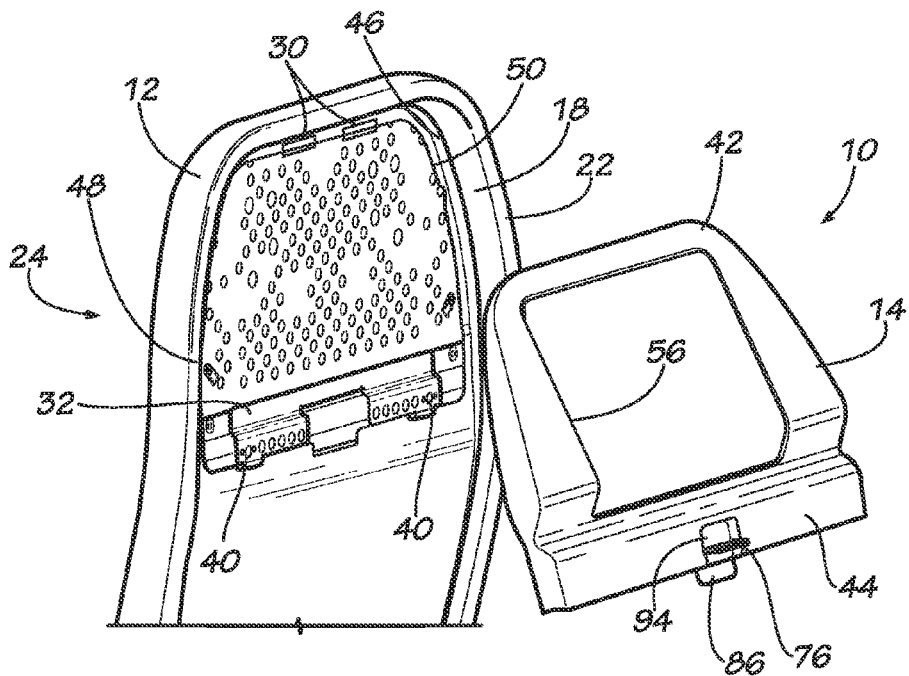
FIG. 17A is a partially exploded perspective view of the seat back assembly of FIG. 1.
Figure 17B:
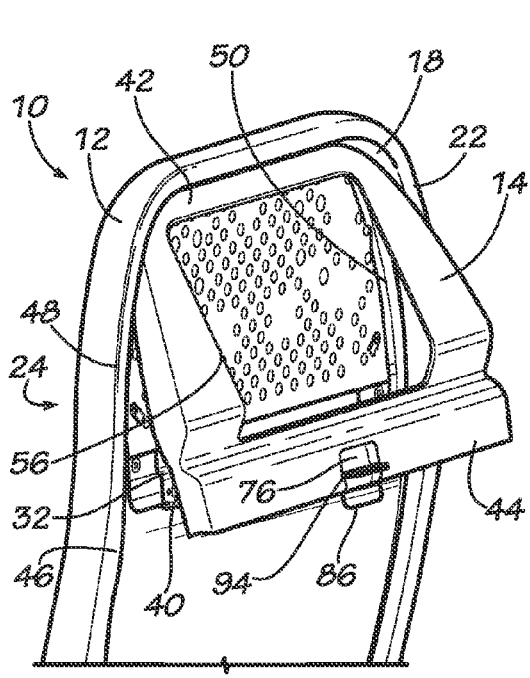
FIG. 17B is a partially assembled perspective view of the seat back assembly of FIG. 1.
Figure 17C:
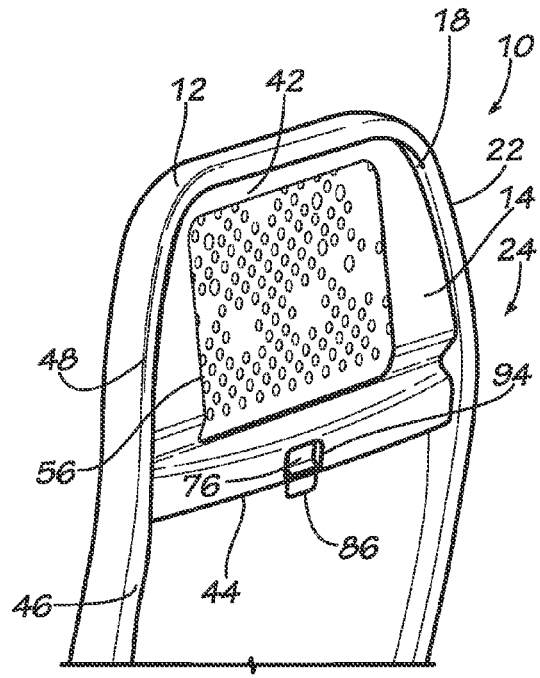
FIG. 17C is an assembled perspective view of the seat back assembly of FIG. 1.

FIGS. 11-12 illustrate the use of the pocket 14 in combination with the dress cover 52 only. FIG. 15 illustrates the use of the pocket 14 in combination with the full shroud 46 embodiment. FIG. 16 illustrates the use of the pocket 14 in combination with the partial shroud 46 embodiment.

In some embodiments, the tray table assembly 16 is coupled to the seat back 12 below the amenity compartment 14. The tray table assembly 16 comprises a pair of arms 64 and a table body 66. The internal structure of the table body 66 may be formed of materials including but not limited to aluminum, stainless steel, aramid fibers, polycarbonate, polypropylene, other metallic materials, composite materials, or other similar materials. In some embodiments, the internal structure of the table body 66 has a honeycomb structure, where the honeycomb structure comprises an arrangement of hollow tubes that are coupled to one another along the length of the hollow tubes. The hollow tubes may have a cylindrical, hexagonal, or other similar cross-sectional shape. Use of the honeycomb internal structure provides the necessary structural integrity for the table body 66 while minimizing the weight of the table body 66.

In other embodiments, the internal structure of the table body 66 comprises a frame that forms the outline of the table body 66, where the frame provides the necessary structural integrity of the table body 66 while minimizing the weight of the table body 66. In this embodiment, the internal structure of the table body 66 may also include at least one bar that connects two sides of the frame to provide additional structural integrity to the table body 66. The number of bars that are used is dependent on, among other factors, the size of the table body 66, the type of material used to form the frame, and the amount of structural integrity required for the table body 66.

The internal structure of the table body 66 may be enclosed by a cover 68. In some embodiments, the internal structure of the table body 66 and the cover 68 may be integrally formed. The cover 68 may be formed of materials including but not limited to polycarbonate, polypropylene, other plastic materials, metallic materials, composite materials, or other similar materials. One of skill in the art will understand that any suitable cover and internal structure may be used to form the table body 66 that will provide a lightweight, slim table body 66 having sufficient strength to withstand forces that may be placed on the tray table assembly 16.

In some embodiments, such as the embodiments illustrated in FIGS. 2-3, 5, 8-9, 11-13, and 15-16, the table body 66 is configured to stow within the lower section 26 of the recess 18. In these embodiments, the table body 66 is shaped to substantially conform to the shape of the lower section 26. In other embodiments, the table body 66 may have a shape that differs from the shape of the lower section 26, while still fitting within the shape of the lower section 26. For example, the lower section 26 may have a rectilinear shape, while the table body 66 may have a trapezoidal shape that fits within the rectilinear shape of the lower section 26. As a result, the table body 66 may have any suitable shape including but not limited to rectilinear, trapezoidal, parabolic, or other suitable shape that fits within the shape of the lower section 26.

Likewise, because the table body 66 is configured to substantially fit within the lower section 26 to minimize the space occupied by the tray table assembly 16 when stowed, the table body 66 may have any suitable thickness that approximates the depth of the lower section 26. For example, in the embodiments illustrated in FIGS. 2-3, 5, 8-9, 11-13, and 15-16, the thickness of the table body 66 may be any appropriate thickness that will allow the table body 66 to stow flush with an outer edge of the lower section 26. In this embodiment, the thickness of the table body 66 is less than one inch, and preferably not greater than one-half inch. In other embodiments, it may be sufficient to partially stow the table body 66 within lower section 26, such that a portion of the table body 66 is partially surrounded by the lower section 26, while another portion of the table body 66 extends into the space outside the lower section 26.

The appropriate size of the lower section 26 and the thickness of the table body 66 for the various embodiments is dependent on, among other factors, the amount of cushioning desired for the seat back 12, the amount of space desired for the passenger, the size and material of the table body 66, and the amount of structural integrity required for the table body 66.

In some embodiments, such as the embodiments illustrated in FIGS. 2-3, 5, 8-9, 11-12, and 15-16, the table body 66 is pivotally coupled to a first end of each arm 64 located at each side of the table body 66. In other embodiments, the table body 66 may be pivotally coupled to a single arm 64 located in the center or to one side of the table body 66. In yet other embodiments, the table body 66 may be coupled to three or more arms 64.

The arms 64 may be formed of materials including but not limited to aluminum, stainless steel, polycarbonate, polypropylene, other metallic materials, composite materials, or other similar materials. In some embodiments, such as the embodiments illustrated in FIGS. 2-3, 5, 8-9, 11-12, and 15-16, each arm 64 is positioned on an exterior side of the seat back 12. Each arm 64 comprises a second end that is configured to pivotally couple to a pivot shaft 70 that is also pivotally coupled to the seat back 12. In some embodiments, each arm 64 is pivotally coupled to the pivot shaft 70 exterior of the location where the seat back 12 is pivotally coupled to the pivot shaft 70. In these embodiments, an extension 72 is used to couple each arm 64 to the table body 66 when the table body 66 is configured to stow substantially within the lower section 26. One of skill in the relevant art will understand that any suitable materials and shapes may be used to form the arms 64 that allow the table body 66 to stow substantially within the lower section 26, the arms 64 to be positioned on the exterior sides of the seat back 12, and that provide sufficient strength to withstand forces that may be placed on the tray table assembly 16.

In the embodiments illustrated in FIGS. 1-3, 7-9, 11-16, 20-22, a latching mechanism 76 may be used to releasably engage the tray table assembly 16 with the amenity compartment 14 to maintain the tray table assembly 16 in a stowed position. To engage the latching mechanism 76, the table body 66 includes a latch keeper 78. The latch keeper 78 is coupled to a recess 80 that is located along the edge 82 of the table body 66. The recess 80 may be formed of materials including but not limited to plastics, foam, metallic materials, composite materials, or other similar materials. In some embodiments, the recess 80 may be integrally formed with the table body 66. In other embodiments, the recess 80 may be inserted into the table body 66. The recess 80 may have any suitable configuration that secures the latch keeper 78 within the table body 66. In some embodiments, the latch keeper 78 is coupled to the recess 80 via mechanical fasteners. However, one of skill in the relevant art will understand that any suitable mechanical or chemical fasteners may be used to couple the latch keeper 78 to the recess 80 and, in turn, to secure the recess 80 to the table body 66.

The latch keeper 78 includes a receptacle 84 that is configured to receive a projection 86 from the latching mechanism 76 to maintain the tray table assembly 16 in a stowed position. The latch keeper 78 may be formed of materials including but not limited to aluminum, sheet metal, stainless steel, other metallic materials, composite materials, plastic materials, or other similar materials.

In some embodiments, the latching mechanism 76 is positioned adjacent the lower surface 44 of the amenity compartment 14. The latching mechanism 76 includes a lever 90, which is configured so that an end 92 of the lever 90 extends through an aperture 94 in the outer surface 28. The lever 90 may be formed of materials including but not limited to plastics, metallic materials, composite materials, or other similar materials.

The lever 90 also comprises extensions 96 that are pivotally coupled to a bracket 98. In the embodiments illustrated in FIGS. 7 and 20-21, the bracket 98 is configured to couple to the bezel 14. In other embodiments, the bracket 98 may have any suitable shape or configuration that allows the bracket 98 to couple with the amenity compartment 14 based on the particular configuration and/or type of amenity to be housed within the amenity compartment 14.

A compressing device 100 is coupled to the lever 90 and the bracket 98, so that the compressing device 100 applies a force to the lever 90 to hold the latching mechanism 76 in the engaged position so that the end 92 is positioned adjacent a lower edge 102 of the aperture 94. In some embodiments, the compressing device 100 may be a torsion spring. However, one of skill in the relevant art will understand that any suitable device may be used to apply a suitable force that maintains the latching mechanism 76 in the engaged position.

A passenger may apply an external force to the lever 90 to overcome the force applied by the compressing device 100 by lifting the lever 90, which transitions the latching mechanism 76 from the engaged position to the disengaged position. When the latching mechanism 76 is held in the disengaged position by the passenger, the end 92 is positioned adjacent an upper edge 104 of the aperture 94. However, once the passenger releases the lever 90, the compressing device 100 applies a force to the lever 90 to return the latching mechanism 76 to the engaged position.

The projection 86 is positioned on a lower surface 106 of the lever 90. When the lever 90 is in the engaged position, the projection 86 extends below the lower surface 44 of the amenity compartment 14. As a result, when the tray table assembly 16 is in a stowed position and the lever 90 is in the engaged position, the projection 86 extends into the receptacle 84 of the latch keeper 78 to maintain the tray table assembly 16 in the stowed position. When the lever 90 is raised by a passenger to the disengaged position, the projection 86 is removed from the receptacle 84 and the tray table assembly 16 rotates to a deployed position.

Other types of engagement between the tray table assembly 16 and the seat back 12 include but are not limited to the type of latch commonly used for mounted tray tables on an aircraft, a slam latch, a pivot latch, snaps, hook and loop fasteners, snap-fit, or any other suitable releasable fastening device.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A seat back assembly comprising:
   (a) a seat back comprising an upper section and a lower section;
   (b) an amenity compartment coupled to the upper section;
   (c) a tray table assembly comprising a table body, wherein the tray table assembly is pivotally coupled to the lower section;
   (d) a latching mechanism configured to releasably engage the tray table assembly with the amenity compartment, wherein the latching mechanism comprises:
      (i) a lever coupled to a lower surface of the amenity compartment and comprising a projection; and
      (ii) a receptacle coupled to the table body and configured to receive the projection when the table body is in a stowed position;
   (e) the latching mechanism is configured to have an engaged position and a disengaged position, wherein:
      (i) when the latching mechanism is in the engaged position, the lever is positioned so that the projection extends below the lower surface of the amenity compartment; and
      (ii) when the latching mechanism is in the disengaged position, the lever is positioned so that the projection does not extend below the lower surface of the amenity compartment; and
   (f) a compressing device configured to apply a force to hold the latching mechanism in the engaged position.

2. The seat back assembly of claim 1, wherein the amenity compartment further comprises an aperture having an upper edge and a lower edge, and wherein the lever is positioned adjacent the lower edge in the engaged position and is positioned adjacent the upper edge in the disengaged position.

3. The seat back assembly of claim 1, wherein the latching mechanism is configured so that the latching mechanism is positioned in the disengaged position when an external force is applied to the lever.

4. The seat back assembly of claim 1, wherein the amenity compartment is a bezel or an upper literature pocket.

5. The seat back assembly of claim 1, wherein the table body is configured to substantially fit within a recess formed in the lower section of the seat back.

6. The seat back assembly of claim 5, wherein the table body has a thickness that approximates a depth of the recess.

7. The seat back assembly of claim 1, wherein the amenity compartment is configured to substantially fit within a recess formed in the upper section of the seat back.

8. The seat back assembly of claim 7, wherein the amenity compartment has a thickness that approximates a depth of the recess.

9. A method of assembling an amenity compartment to a seat back, the seat back comprising at least one slotted bracket and at least one mounting bracket, the amenity compartment comprising at least one hook and at least one projection, the method comprising:
   (a) engaging the at least one hook of the amenity compartment with the at least one slotted bracket of the seat back;
   (b) rotating the amenity compartment so that an inner surface of the amenity compartment is adjacent the at least one mounting bracket of the seat back; and
   (c) engaging the at least one projection of the amenity compartment with at least one receptacle positioned on the seat back.

10. The method of claim 9, further comprising the step of attaching mechanical fasteners to secure a lower surface of the amenity compartment to the at least one mounting bracket.

11. The method of claim 9, wherein the at least one projection comprises a plurality of ball detents and the at least one receptacle comprises a plurality of ball receptacles.

12. The method of claim 9, wherein the amenity compartment is a bezel or an upper literature pocket.

13. The method of claim 9, further comprising the step of positioning a protective covering between the seat back and the amenity compartment prior to coupling the amenity compartment to the seat back.

14. The method of claim 13, wherein the protective covering is a full shroud, a partial shroud, or a dress cover.

15. The method of claim 13, wherein the protective covering is coupled to the seat back via the coupling between the seat back and the amenity compartment without additional fasteners.

* * * * *